United States Patent

Abe et al.

[11] Patent Number: 5,846,466
[45] Date of Patent: Dec. 8, 1998

[54] METHOD FOR FORMING A LAMINATE STRUCTURAL MOLDING

[75] Inventors: Tomokazu Abe; Satoshi Matsumoto; Toshifumi Shimazaki, all of Ichihara, Japan

[73] Assignee: Idemitsu Petrochemical Co., Ltd., Tokyo, Japan

[21] Appl. No.: 668,564

[22] Filed: Jun. 19, 1996

Related U.S. Application Data

[62] Division of Ser. No. 255,475, Jun. 8, 1994, abandoned.

[30] Foreign Application Priority Data

| Jun. 10, 1993 | [JP] | Japan | 5-138441 |
| Jun. 22, 1993 | [JP] | Japan | 5-150341 |
| Feb. 1, 1994 | [JP] | Japan | 6-010430 |

[51] Int. Cl.⁶ .......................... B29C 43/34; B29C 45/56; B29C 45/74
[52] U.S. Cl. ............... 264/259; 264/328.7; 264/328.15; 425/129.1; 425/549; 425/566
[58] Field of Search .................... 425/562, 563, 425/564, 565, 566, 127, 129.1, 549; 264/259, 267, 279, 294, 328.7, 328.15

[56] References Cited

U.S. PATENT DOCUMENTS

| 3,652,757 | 3/1972 | Wessel et al. .................... 264/328.7 |
| 4,075,266 | 2/1978 | Theysohn .............................. 264/328.7 |
| 4,618,466 | 10/1986 | McGlashen et al. ................. 264/328.7 |
| 4,686,076 | 8/1987 | Dromigny et al. ...................... 264/275 |
| 4,892,474 | 1/1990 | Gellert ..................................... 425/566 |
| 5,281,376 | 1/1994 | Hara et al. ........................... 264/328.7 |
| 5,676,901 | 10/1997 | Higashi et al. ......................... 264/255 |

FOREIGN PATENT DOCUMENTS

| 94/00284 | 1/1994 | WIPO ................................ 264/328.7 |

*Primary Examiner*—Jill L. Heitbrink
*Attorney, Agent, or Firm*—Flynn, Thiel, Boutell & Tanis, P.C.

[57] ABSTRACT

A die for injection molding for charging molten resin onto a surface material set on the cavity surface is disclosed. The die comprises direction changing means for changing the direction of flow of the molten resin charged through the gate to directions along the surface of the surface material. The direction changing means may be a substantially conical direction changing member for changing the direction of flow of the molten resin. Since the direction changing means can change the direction of flow of the molten resin charged into the die, which is completely closed or slightly open, to directions along the surface of the surface material, the molten resin does not strike the surface material. Thus, damage to the surface material in the neighborhood of the gate can be prevented, and the surface material can be protected against the collision with molten resin which is at a high temperature and under a high pressure.

12 Claims, 17 Drawing Sheets

F I G. 14
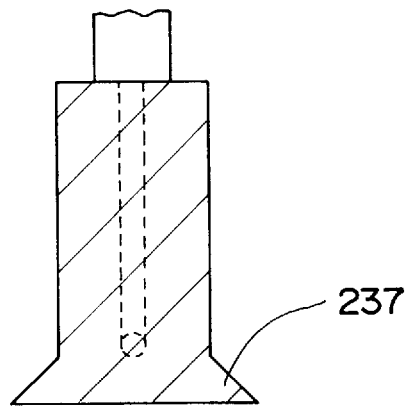
F I G. 15
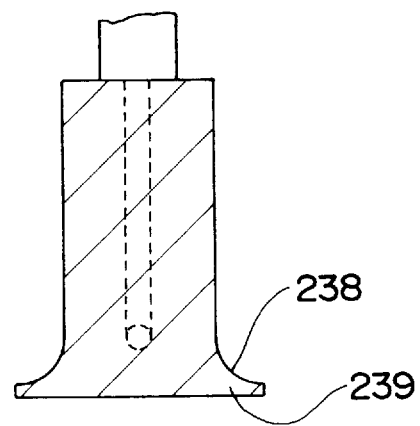

F I G. 16
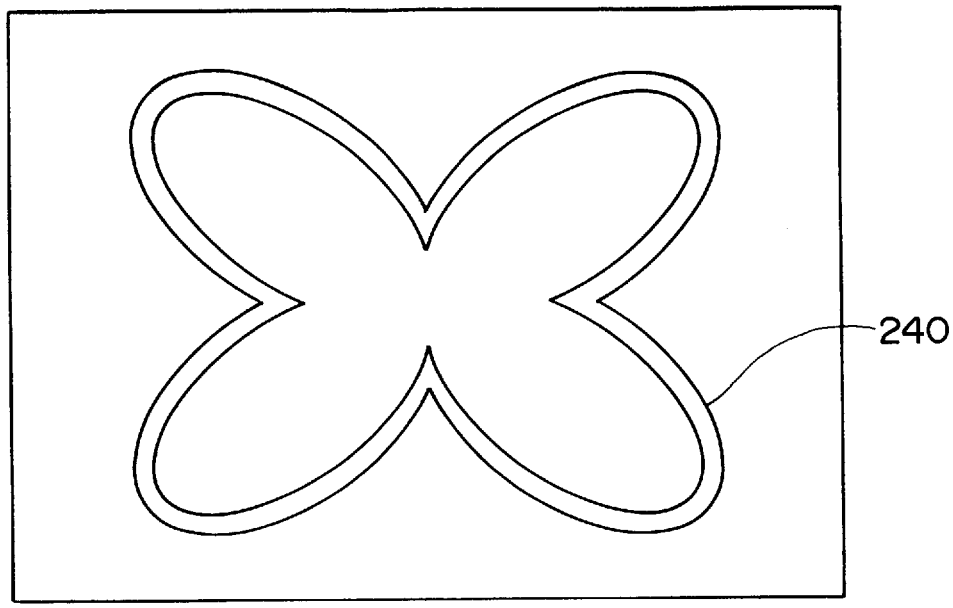
F I G. 17
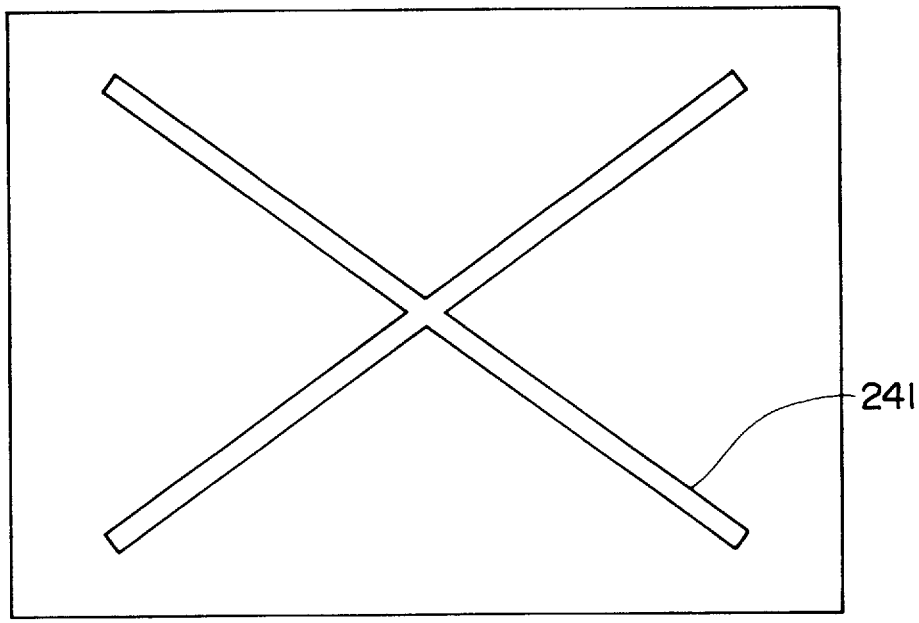

METHOD FOR FORMING A LAMINATE STRUCTURAL MOLDING

This is a divisional of U.S. Ser. No. 08/255,475, filed Jun. 8, 1994, now abandoned.

BACKGROUND OF THE INVENTION

1. Field of the Invention

This invention relates to injection molding dies and is applicable to the manufacture of resin products, for which appearance quality is required, such as inner and outer automobile fittings, for instance dashboards, door panels, etc.

2. Description of the Related Art

Laminar structure moldings are well known in the art, which have an integral laminated surface material. With the laminar structure of molding, it is possible to obtain satisfactory appearance and also excellent cushioning property owing to the surface material. A further advantage is obtainable that the touch or sense of the product surface can be readily changed by changing the sole surface material.

Such molding is obtainable by charging a molten resin onto a surface material, such as a sheet or a film, which has been set in a die cavity in advance.

However, in the prior art injection molding die the molten resin is charged at a high temperature and under a high pressure. Therefore, when the molten resin is charged with the die held imperfectly closed or slightly open from the perfectly closed state (hereinafter referred to as "slightly open state"), as shown in FIG. 22, the molten resin 62 flowing into the cavity 61 of the die 60 strikes the surface material 63 set in the cavity 61 while it is at a high temperature and under a high pressure. Therefore, the surface material 63 may be damaged, thus resulting in deterioration of the appearance of the product molding or loss of the cushioning property of the product.

To prevent such damage to the surface material, it is thought to charge the molten resin into the die for injection compression molding with the die held open to a large extent so that the molten resin may be sufficiently reduced in pressure and cooled down until reaching the surface material.

However, when the molten resin is cooled due to the large extent open state of the die, the fluidity of the molten resin is deteriorated to spoil the moldability. In addition, causing forced flow of the molten resin with the deteriorated fluidity makes the surface of the molten resin wavy, thus resulting in the formation of wrinkles or the like on the surface of the surface material to spoil the appearance of the molding.

Further, in a horizontal injection molding machine there is a further problem in addition to the above problems. In the horizontal injection molding machine the injection molding is carried out by holding the die cavity vertical. Therefore, with the die held open to a large extent the charged molten resin is deviated due to the gravity, so that the thickness of the molding product may not be uniform.

It is an object of the invention to provide a injection molding die, which permits charging of molten resin with the die held open to a small extent without causing damage to a surface material that has been set in the die in advance.

SUMMARY OF THE INVENTION

One feature of the invention resides in an injection molding die, in which molten resin is charged onto a surface material set in the die cavity, and which is provided with direction changing means for changing the direction of flow of the molten resin into the cavity through the gate thereof to directions along the surface of the surface material.

As the direction changing means may be adopted a substantially conical direction changing member, which is provided at an end of a rod capable of being projected from and retreated to the gate and can serve to effect the molten resin flow direction change as noted above.

The surface material that is used may be a laminate material, which is obtained by laminating a surface layer not readily broken and a foam layer or a textile layer having a cushioning property, non-woven cloth, a film with ink impression for foil film transfer, etc.

For the surface layer of the laminate material may be used vinyl chloride, thermoplastic elastomer, non-woven cloth, woven cloth, etc.

For the foamed layer of the laminate material may be used foamed polypropyrene with or without backing by non-woven or woven cloth.

For the textile layer of the laminate material may be used thick non-woven cloth.

For the base material of the resin may be used thermoplastic resins, e.g., polypropyrene, polystyrene, polyethylene, polycarbonate, ABS, polyamide, etc., fiber reinforced resins obtainable by incorporating talc or glass fibers in the above thermoplastic resins, and thermosetting resins, e.g., polyester, epoxy, etc.

According to the invention as shown above, as the molten resin is charged into the die which is held in the perfectly closed state or slightly open state, its flow direction is changed by the direction changing means to directions along the surface of the surface material. Thus, the molten resin does not collide with the surface material. It is thus possible to prevent damage to the surface material in the neighborhood of the gate. It is thus possible to attain the object noted above.

BRIEF DESCRIPTION OF THE DRAWINGS

FIG. 14 is a fragmentary sectional view showing direction changing means in another modification of the third embodiment of the invention;

FIG. 15 is a fragmentary sectional view showing direction changing means in still another embodiment of the third embodiment of the invention;

FIG. 16 is a plan view showing a gate in another modification of the third embodiment of the invention;

FIG. 17 is a plan view showing a gate in still another modification of the third embodiment of the invention;

DETAILED DESCRIPTION OF THE PREFERRED EMBODIMENT(S)

Now preferred embodiment of the invention will be described with reference to the drawings.

FIRST EMBODIMENT

Figure 1:
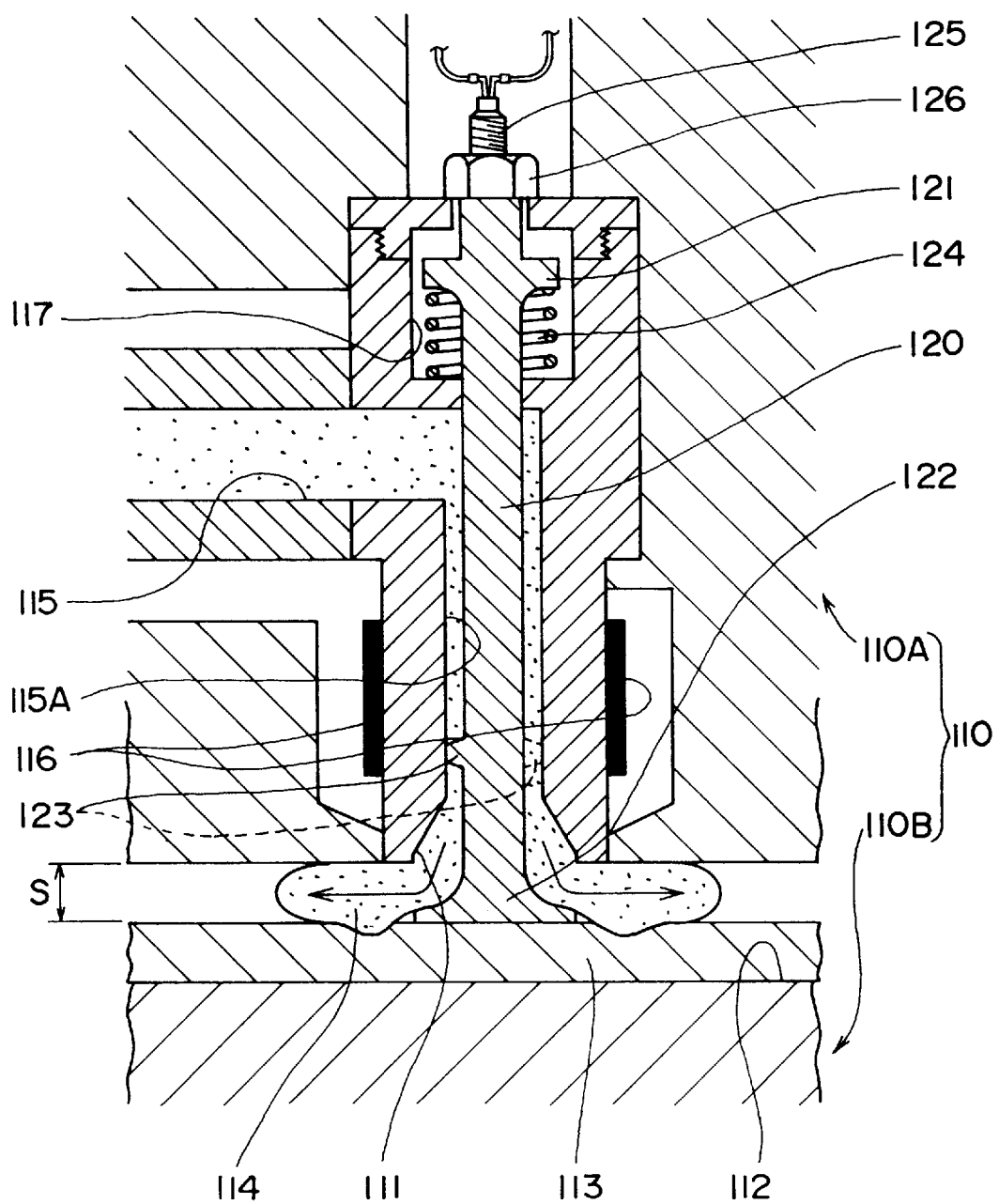
FIG. 1 is a fragmentary sectional view showing an essential part of a first embodiment of the injection molding die according to the invention.

FIG. 1 shows a first embodiment of the injection molding die 110 according to the invention, with the neighborhood of a gate 111 shown exaggirated.

Figure 3A:
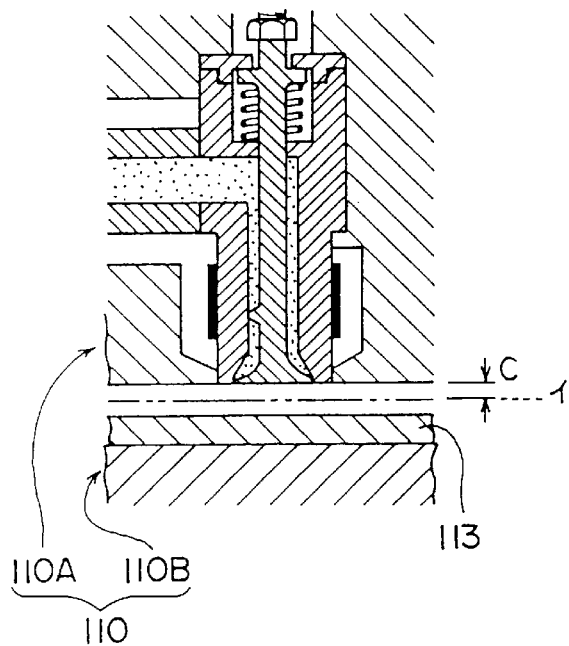
FIGS. 3(A) to 3(C) are views for explaining the procedure of injection molding in the same embodiment.
Figure 3B:
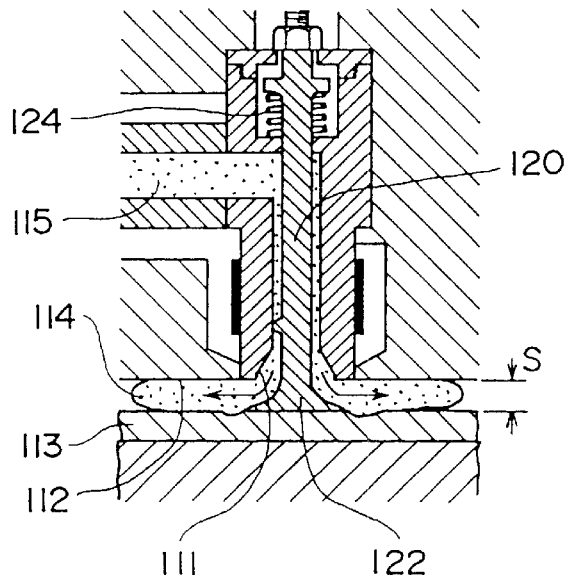
Figure 3C:
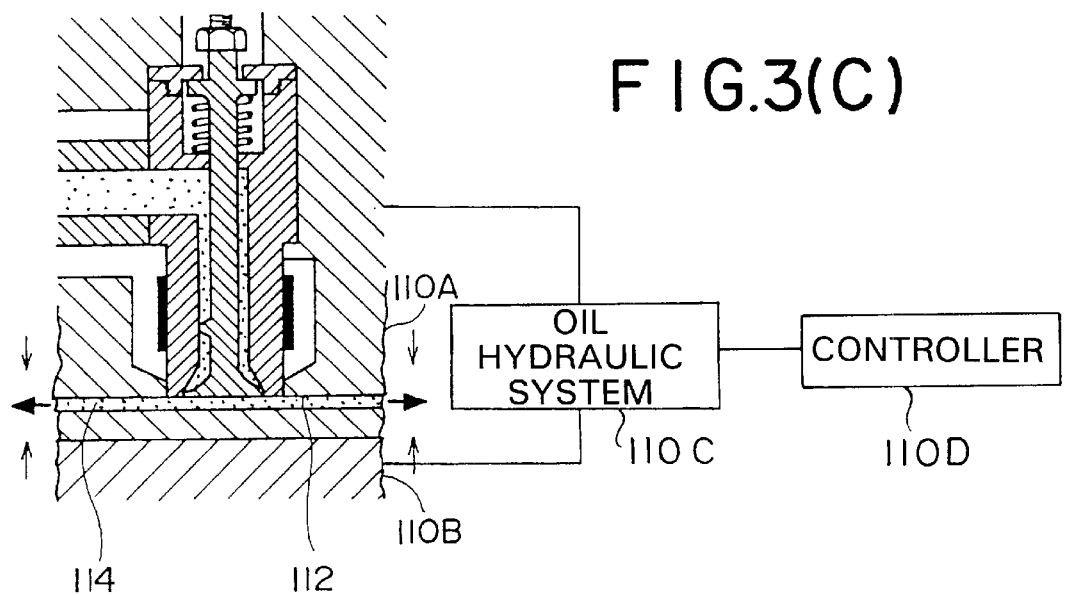

The die 110 defines an inner cavity 112 having a uniform thickness for molding a large size product, and it comprises two die halves 110A and 110B on the opposite sides of the cavity 112, an oil hydraulic system 110C for closing the die and a controller 110D for controlling the oil hydraulic system (FIG. 3C). A surface material is set in advance in the cavity 112 for charging molten resin 114 onto the surface material 113.

The gate 111 serves as an injection port, through which the molten resin 114 is injected into the cavity 112 of the die 110, and it is connected to a supply path 115, through which molten resin 114 is forcively supplied from an injection unit (not shown).

The supply path 115 has an L-shaped end on the side of the cavity 112 such that a straight portion 115A as one side of the L-shaped end extends at right angles to the surface of the cavity 112. An electric heater 116 is provided around the straight portion 115A lest the molten resin 114 in the straight portion 115A should be cooled down and solidified during the injection molding. A rod-like member 120 is provided in the straight portion 115A.

The rod-like member 120 has a flange 121 provided adjacent its upper end and projecting radially as an engagement portion. It also has at its other or lower end a substantially conical direction changing portion 122 as direction changing means. It further has at an intermediate position in its length direction a projection 123, which engages with the inner surface of the straight portion 115A to guide the rod-like member 120 in the length direction of the straight portion 115A.

The flange 121 is in engagement with a coil spring 124 accommodated in a space or coil spring chamber 117 formed above the straight portion 115A of the supply path 115.

The coil spring 124 serves as biasing means for biasing the rod-like member 120 in engagement with the flange 121 upward in the Figure. More specifically, it serves to push the direction changing portion 122 against the gate 111 for closing the same 111. The biasing force of the coil spring 124 is set to the weaker than the pressure of the molten resin being injected. Thus, the pressure of the molten resin 114 being injected into the cavity 112 is applied to the direction changing portion 122 to cause the direction changing portion 122 to be projected against the biasing force of the coil spring 124 so as to open the gate 111.

The extent S, to which the direction changing portion 122 is projected from the gate 111, is adjustable by changing the position of a nut 126 screwed on a threaded shaft portion 125 extending upward from the flange 121.

Figure 2:
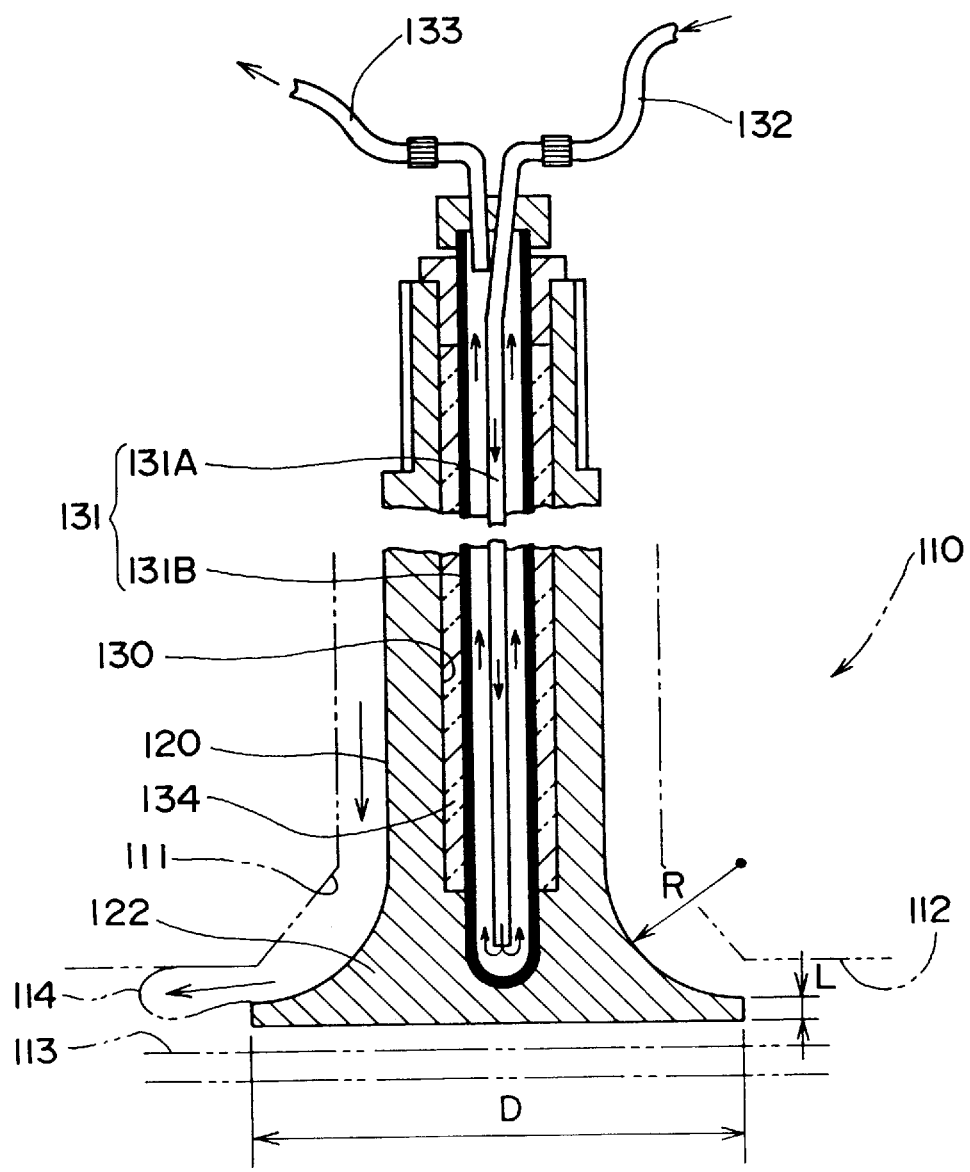
FIG. 2 is an enlarged-scale sectional view, partly broken away, showing direction changing means in the same embodiment.

The rod-like member 120, as shown in FIG. 2, is hollow and has an inner space 130 which extends substantially over the entire length of the member. In the inner space 130 a pipe 131 forming a cooling water path is provided as cooling means for cooling the direction changing portion 122.

The pipe 131 defines a double-wall structure path comprising an inner and an outer pipe 131A and 131B having a large and a small diameter respectively, which extend coaxially in the length direction of the rod-like member 120. Both the pipes 131A and 131B extend into the direction changing portion 122.

The inner pipe 131A supplies cooling water supplied from a supply pipe 132, which is connected to the upper end of the inner pipe 131A, to the interior of the direction changing portion 122.

The outer pipe 131B serves to return cooling water that has cooled down the direction changing portion 122 to a return pipe 133, which is connected to the upper end of the pipe 131B.

A sheet-like heat insulator 134 is interposed between the outer periphery of the outer pipe 131B and the inner periphery of the rod-like member 120, and it can prevent cooling water flowing through the rod-like member 120 from cooling the molten resin 114 around the rod-like member 120. It is thus made possible to maintain the fluidity of the molten resin 114.

The direction changing portion 122 serves to change the direction of flow of the molten resin 114 as the molten resin 114 flows out of the gate 111. To this end, it constitutes a rotor having a hill-like sectional profile, having arcuate upper corners. Regarding the section of the direction changing portion 122, the radius R of the arcuate corners and the length dimension L of the straight portion under the arcuate corners are set such that $$5 \text{ mm} < R < 30 \text{ mm and } 0 \text{ mm} \leq L < 5 \text{ mm}.$$

The direction changing portion 122 is circular in plan view with a diameter D, which can be set as desired and independently of the radius R or length dimension L.

In this embodiment, the injection compression molding is carried out in the following procedure.

The surface material 113 is set in advance on the surface of the cavity 112 in the die 110. Then, the die halves 110A and 110B are closed to a state as shown in FIG. 3(A), in which the die 110 is held slightly open to a predetermined extent C from the completely closed state. The extent C can be set in a range of 0.1 to 100 mm.

Subsequently, the injection unit (not shown) is driven to inject the molten resin 114 through the supply path 115 into the cavity 112. At the same time, as shown in FIG. 3B), the direction changing portion 122 at the end of the rod-like member 112 is projected from the gate 111 to an extent S against the biasing force of the coil spring 124, thus bringing the bottom of the direction changing portion 122 into forced contact with the surface material 113.

In this state, the direction of flow of the molten resin 114 is changed by the direction changing portion 122 to directions along the surface of the surface material 113, so that the molten resin 114 is cooled down by cooling water flowing through the interior of the direction changing portion 122. Thus, the surface material 113 in the neighborhood of the gate 111 is protected against the high temperature and high pressure of the high temperature, high pressure molten resin supplied from the gate 111.

Subsequently, as shown in FIG. 3(C), the closing of the die halves 110A and 110B is resumed. By this resumed die closing, the molten resin 114 in the cavity 112 is developed up to the corners of the cavity 112 to obtain a molding having a desired product shape. The product is then cooled down and then released from the die, thus completing the molding process.

With this embodiment, the following effects are obtainable.

With the direction changing portion 122 provided at the gate 111 of the die 110 such as to change the direction of flow of the molten resin 114 to directions along the surface of the surface material 113, the high temperature, high pressure molten resin 114 that is charged with the die 110 held in the completely closed state or slightly open state, dues not strike the surface material 113. Thus, it is possible to obtain injection molding without causing damage to the surface material 113.

In addition, with the pipe 131 provided as cooling water path in the rod-like member 120 to cool the direction changing portion 122 with the cooling water passing through the pipe 131, the high temperature, high pressure molten resin 114 charged through the gate 111 does not cause thermal damage to the surface material 113 in the neighborhood of the gate 111. Thus, it is also possible to obtain injection molding without causing damage to the surface material 113.

Further, since the gate 111 is opened with the direction changing portion 122 pushed up by the pressure of the molten resin 114 being charged against the biasing force of the coil spring 124, with the completion of charging of the molten resin 114 the direction changing portion 122 is automatically accommodated in the gate 111 by the coil spring 124 or the like. Thus, there is no particular need for controlling the direction changing portion 122, and it is thus possible to simplify the controller for controlling an oil hydraulic system for closing the die 110.

Further, since the direction changing portion 122 which is held in forced contact with the surface material is cooled down while avoiding the collision of the high temperature, high pressure molten resin with the surface material 113, in case where the surface material 113 includes a foamed layer of thermally weak foamed polypropyrene or the like, the melting of the foamed layer can be minimized, so that it is possible to maintain the satisfactory cushioning property of the surface material 113 after the completion of the molding as well.

Further, since the molten resin 114 does not collide, even in case where the surface material 113 is made of non-woven cloth, the surface material 113 is not impregnated with the molten resin 114, and it is thus possible to maintain the softness of the non-woven cloth after the completion of the molding as well.

Further, since the collision of the molten resin 114 is avoided, even in case where the surface material 113 is a film with an impression of ink for foil film transfer, spattering of ink for foil film transfer or deviation of ink do not occur, and it is thus possible to obtain a satisfactory molding product with impression of drawings, characters, etc. on the surface.

SECOND EMBODIMENT

Figure 4:
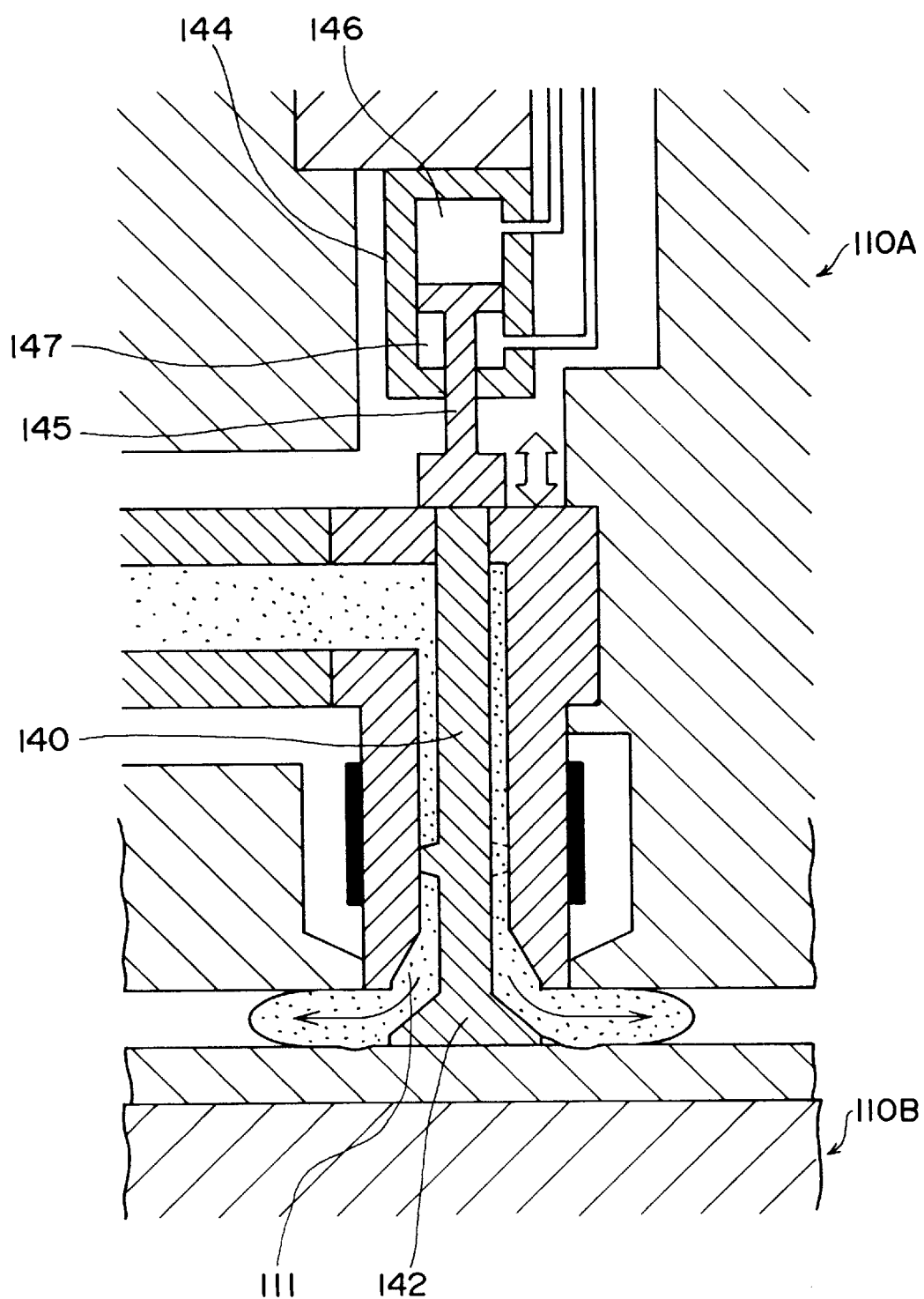
FIG. 4 is a view similar to FIG. 1 but showing a second embodiment of the invention.

FIG. 4 shows a second embodiment of the invention. In this embodiment, an oil hydraulic cylinder assembly 144 is adopted in lieu of the coil spring 124 in the preceding first embodiment.

More specifically, in this embodiment the rod-like member 140 has no flange adjacent its upper end, but a plunger 145 of the oil hydraulic cylinder assembly 144, which is secured to the side of the die half 110A, is coupled to the upper end of the rod-like member.

The oil hydraulic cylinder assembly 144 is of double driven type having two inner pressure application chambers 146 and 147. When operating fluid is supplied to the pressure application chamber 146, the rod-like member 140 is moved upward in the Figure so that the direction changing portion 142 closes the gate 111 that has been in the open state. When operating fluid is supplied to the other pressure application chamber 147, the rod-like member 140 is moved downward so that the direction changing portion 142 opens the gate 111 having been in the closed state and projects from the gate 111.

Figure 5:
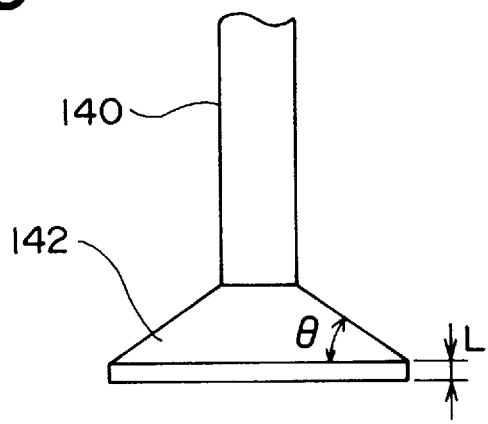
FIG. 5 is an enlarged-scale sectional view showing a direction changing member in the same embodiment.

The direction changing portion 142 at the lower end of the rod-like member 140, as shown in FIG. 5, is in the form of a rotor having a hill-like sectional profile with inclined upper comers. As for the section of the direction changing portion 142, the angle $\theta$ between each inclined upper corner and the plane perpendicular to the axis of rotation and the length dimension L of the straight portion under the inclined upper comers are set such that $$10°<\theta<60° \text{ and } 0 \text{ mm} \leq L<5 \text{ mm}.$$

In this embodiment, the same functions and effects as in the first embodiment are obtainable. In addition, the gate 111 can be forcibly closed by the direction changing portion 142, and it is thus possible to select the timing of closing. That is, it is possible to adopt an optimum timing of closing in correspondence to the base material used for molding, such as a synthetic resin, to obtain a high quality product by the injection molding at all times.

Now, the effects obtainable according to the invention will be described specifically in connection with the following Experiment Examples 1 and 2.

EXPERIMENT EXAMPLE 1

In Experiment Example 1, Experiment 1, in which injection compression molding was done with the first embodiment of the die according to the invention with the radius R noted above set to 10 mm and the length dimension L set to 2 mm, and Experiment 2, in which injection compression molding was done with the first embodiment of the die with the radius R and length dimension L set to be 35 and 0 mm, respectively, outside the ranges in the first embodiment, were conducted. The effects according to the invention were confirmed by comparing the molding products obtained in Experiment 1 and Experiment 2.

INJECTING CONDITIONS IN EXPERIMENT EXAMPLE 1

Experiment 1 and Experiment 2 noted above were conducted by using an exclusive horizontal injection molding machine, which was obtained by modifying a general purpose machine into an injection molding machine, and a die having gates provided at four positions for molding an automotive door inner fixing having a thickness of 2.5 mm (1200 mm×800 mm).

In Experiment 1 and Experiment 2, as the base material was used talc-containing polypropylene (available under a trade name "Idemitsu Polypro TR163" by Idemitsu Petrochemical Co., Ltd.), and as the surface material was used non-woven cloth. The injection compression molding was carried out under the following conditions:

A. Molding temperature: 180 ° C.
B. Die temperature: 40 ° C.
C. Injection time: 4 sec.
D. Injection pressure: 120 kg/cm² (gauge pressure)
E. Cooling time: 50 sec.
F. Extent C of opening of the die in the slightly open state: 15 mm
G. Die closing resumption timing: 2.8 sec. after the start of charging of molten resin
H. Die closing speed: 10 mm/sec.
I. Compressive load when closing the die: 150 tons
J. Diameter D of direction changing portion: 40 mm
K. Extent S of projection of direction changing portion: 12 mm

RESULTS IN EXPERIMENT EXAMPLE 1

The molding product obtained in Experiment 1 was checked by visual inspection and found to be free from impregnation of the non-woven cloth as the surface material with molten resin and have satisfactory sense of touch of the non-woven cloth as a whole.

On the other hand, the molding product obtained in Example 2, which was checked by visual inspection as in Experiment 1, was found to be a defective product with the surface of the surface material impregnated with molten resin in the neighborhood of the gates, thus spoiling the sense of tough.

EXPERIMENT EXAMPLE 2

In Experiment Example 2, Experiment 3, in which injection compression molding was done with the second embodiment of the die according to the invention with the angle θ and the length dimension L set to 20° and 2 mm, respectively, and Experiment 4, in which injection compression-molding was done with the second embodiment of the die with the angle θ and the length dimension L set to 70° and 6 mm, respectively, outside the ranges in the second embodiment, were conducted. The effects of the invention were confirmed by comparing the molding products obtained in Experiment 3 and Experiment 4.

INJECTING CONDITIONS IN EXPERIMENT 2

Experiment 3 and Experiment 4 noted above were conducted by using the same horizontal injection molding machine (with a screw diameter of 160 mm and a max. compressive force of 850 tons) as in Experiment 3 and a die with a gate provided at the center of the cavity to obtain a disk-like molding product with a thickness of 2.0 mm and a diameter of 800 mm.

In Experiment 3 and Experiment 4, as the base material was used polypropylene (available under a trade name "Idemitsu Polypro J-5066H" by Idemitsu Petrochemical Co., Ltd.). As the surface material was used a laminate material (manufactured by Kyowa Laser Co., Ltd.) having vinyl chloride layer 0.6 mm thick and a foamed polypropyrene layer 3.0 mm thick. The injection molding was done under the following conditions.

A. Molding temperature: 180 ° C.
B. Die temperature: 40 ° C.
C. Injection time: 2 sec.
D. Injection pressure: 120 kg/cm² (gauge pressure)
E. Cooling time: 40 sec.
F. Extent C of opening of the die in the slightly open state: 10 mm
G. Die closing resumption timing: 1.9 sec. after the start of charging of molten resin
H. Die closing speed: 10 mm/sec.
I. Compressive load applied when closing the die: 100 tons
J. Diameter D of direction changing poriton: 40 mm
K. Extent S of projection of direction changing portion: 7 mm

RESULTS OF EXAMPLE 2

Figure 6:
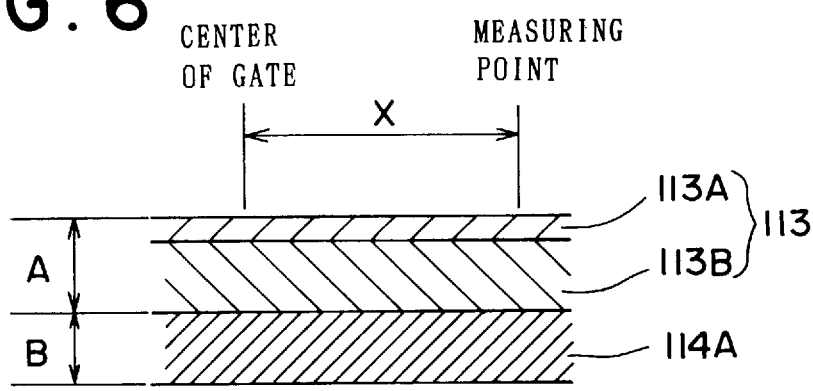
FIG. 6 is a fragmentary sectional view showing a molding product in Experiment Example 1.

The molding product obtained in Experiment Example 2, as shown in FIG. 6, had a three-layer structure comprising a surface layer 113A of vinyl chloride, a foamed layer 113B of foamed polypropylene, these layers 113A and 113B being of the surface material 113, and a base material layer 114A of polypropylene as the base material. A section of the product was observed with a universal projector (manufactured by Nikon Co., Ltd.). As a result, it was found that the molding product was satisfactory such that, as shown in Table 1, the surface material 113 and the base material layer 114A were uniform in their thicknesses A and B and that the surface material 113 was free from breakage.

TABLE 1

| THICKNESS (mm) OF LAYERS IN EXPERIMENT 3 | | | | |
|---|---|---|---|---|
| | Right under gate | Distance X from gate | | |
| | | 20 mm | 200 mm | 390 mm |
| Thickness A of surface material layer | 2.7 | 2.6 | 2.8 | 2.8 |
| Thickness B of surface material layer | 1.9 | 1.9 | 1.9 | 1.8 |

A section of the molding product obtained in Experiment 4 was also observed with the same universal projector as in Experiment 3. It was found as a result that the product was defective in that, as shown in Table 2, the surface material 113 was broken in a portion thereof corresponding to the gate edge due to fusion of the foamed layer 113B and that the appearance was thus spoiled.

TABLE 2

THICKNESS (mm) OF LAYERS IN EXPERIMENT 4

| | Right under gate | Distance X from gate | | |
|---|---|---|---|---|
| | | 20 mm | 200 mm | 390 mm |
| Thickness A of surface material layer | 2.4 | BROKEN | 2.8 | 2.7 |
| Thickness B of surface material layer | 1.9 | 1.9 | 1.9 | 1.8 |

The embodiments described above are by no means limitative, and the invention may cover the following modifications.

Figure 7:
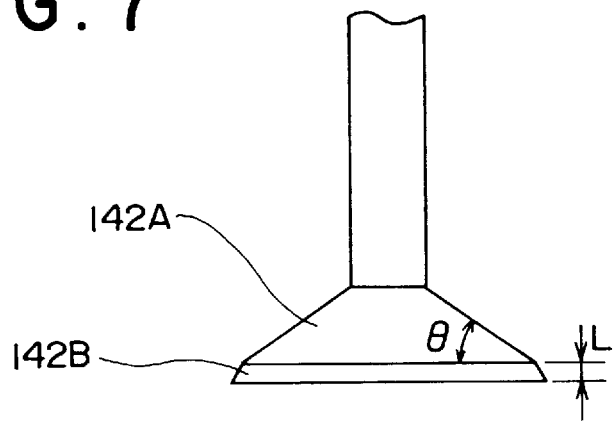
FIG. 7 is a view similar to FIG. 5 but showing a modification of the first embodiment of the invention.

The sectional profile of the direction changing portion is not limited to the one noted above, having the hill-like portion and the rectangular bottom portion. For example, it is possible to adopt a sectional profile as shown in FIG. 7, having a hill-like portion 142A and a frust-conical bottom portion 142B.

Further, the plan shape of the direction changing portion may not be circular but may be elliptical or polygonal as well. Generally, the specific shape of the direction changing portion may be selected suitably in practice.

Figure 8:
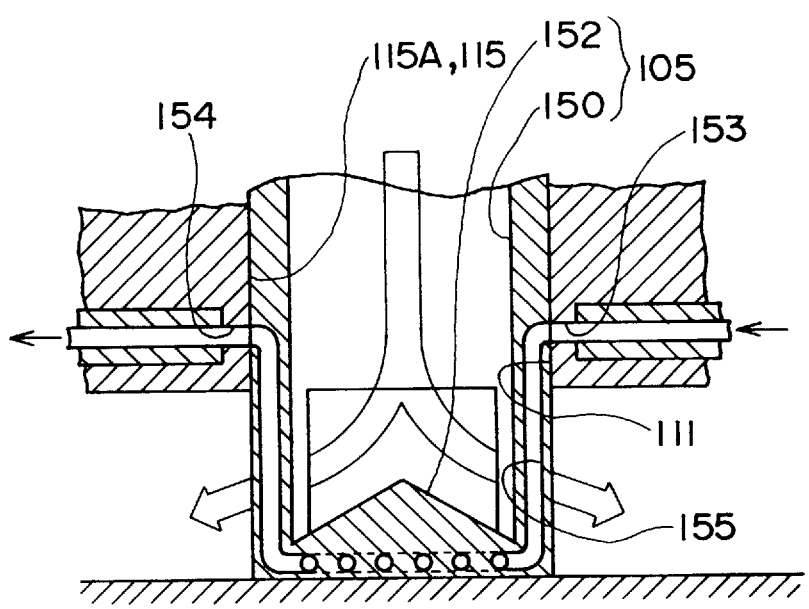
FIG. 8 is a view similar to FIG. 2 but showing a different modification of the first embodiment of the invention.

Further, the direction changing means is not limited to the one with the direction changing portion provided at the bottom of the rod-like member. For example, it is possible to adopt direction changing means 105 as shown in FIG. 8, which has a conical direction changing member 152 provided at the bottom of a cylinder 150. In general, it is possible to adopt any specific structure, which can change the direction of flow of molten resin through the gate to directions along the surface of the surface material.

When adopting the cylindrical direction changing means 105 as above, cooling water supply and draining ports 153 and 154 are disposed in opposite positions in the wall of a straight portion 115A of a water supply path 115, and the direction changing means 105 is disposed such that it projects from the gate 111. In this arrangement, the cooling water path 115 provided in the direction changing means 1)5 communicate with the supply and draining ports 153 and 154.

THIRD EMBODIMENT

Figure 9:
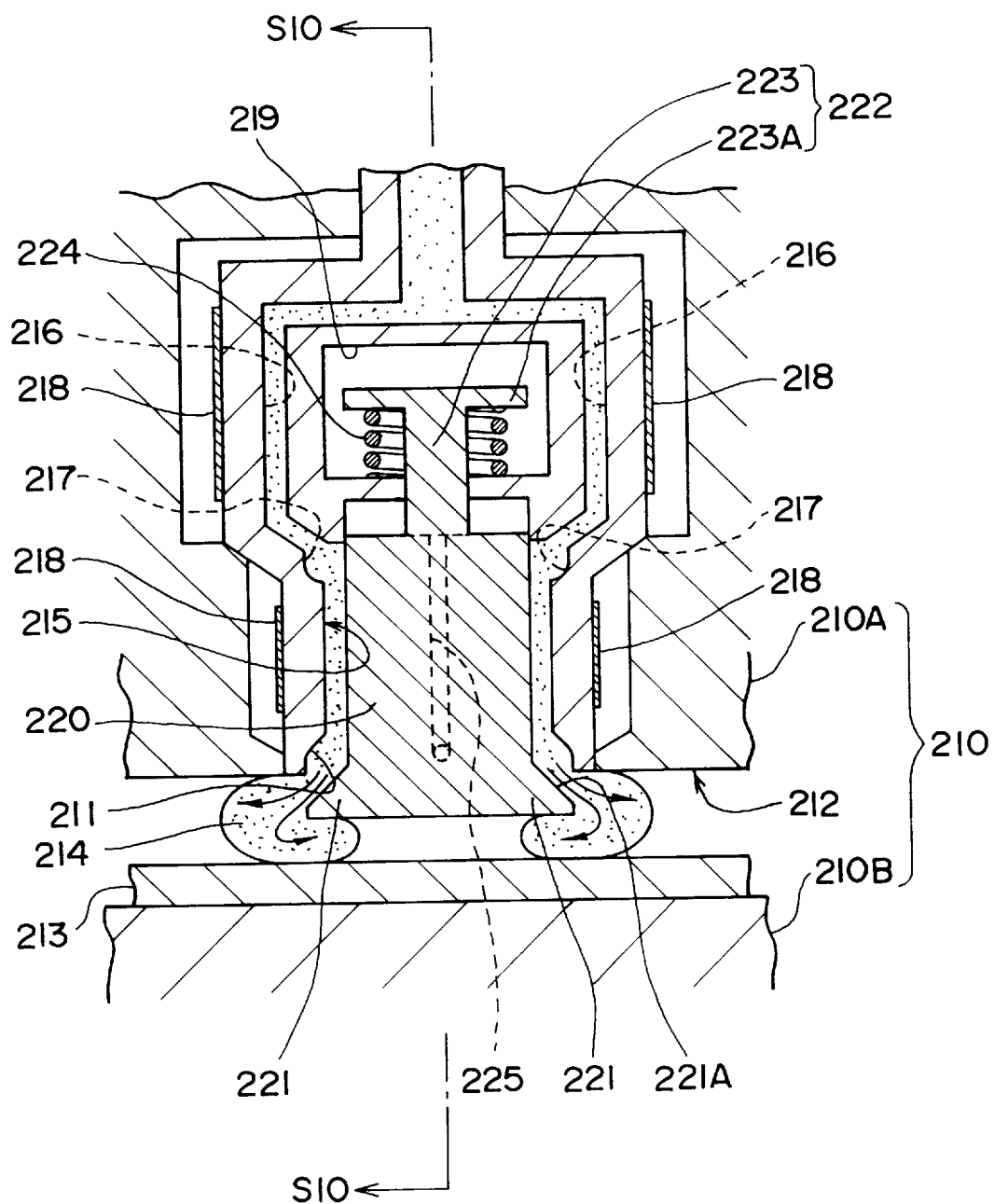
FIG. 9 is a fragmentary sectional view showing an essential part of a third embodiment of the die according to the invention.

FIG. 9 shows a third embodiment of the die 210 according to the invention with the neighborhood of a gate 211 shown exaggirated.

The die 210 defines a cavity 212 having a uniform thickness for injection compression molding a large size sheet-like product. It comprises two die halves 210A and 210B constituting the opposite sides of the cavity 212. A surface material 213 is set in and on the surface of the cavity 212 in advance, and molten resin 214 is charged onto the surface material 213.

The gate 211 is in the form of a ring-like slot which is spread at least in two directions along the surface of the cavity 212.

More specifically, the gate 211 is an elliptically spread gap formed between an elliptical recess 215 open at the surface of the cavity 212 and an elliptical cylindrical member 220, which is capable of being brought into and out of the recess 215 and has a bottom surface corresponding to the recess 215.

Figure 10:
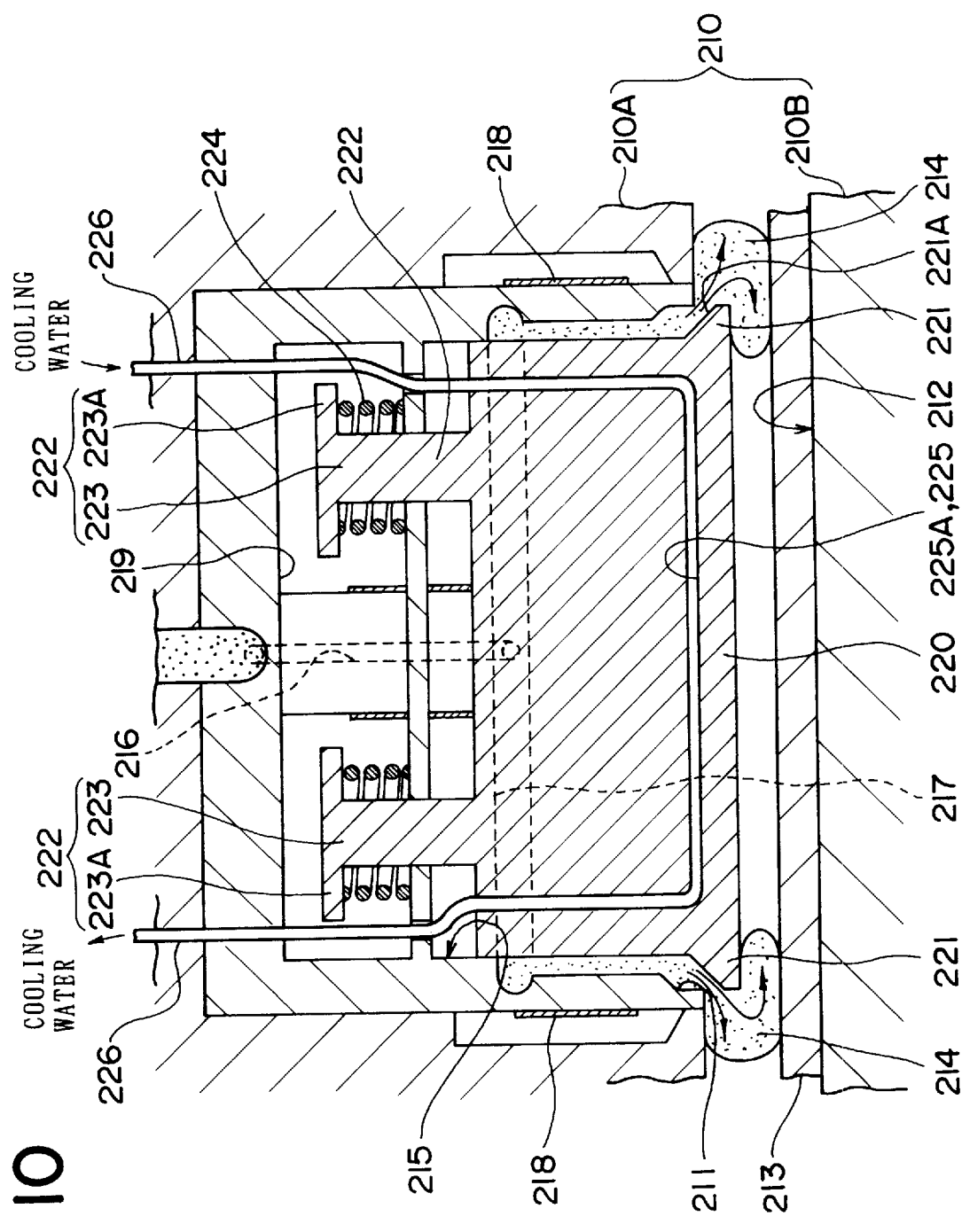
FIG. 10 is a fragmentary sectional view taken along line S10—S10 in FIG. 9.

To the gate 211 molten resin 214 is supplied through a downwardly extending main supply path 216. As shown in FIG. 10, the inner periphery of the gate 211 is formed with a circumferentially extending, annular distribution path 217. This distribution path 217 permits molten resin 214 to be supplied over the entirety of the gate 211.

An electric heater 218 is provided around the outer periphery of the wall defining the gate 211 and the main supply path 216, and it serves to prevent the molten resin 214 in the gate 211 and the main supply path 216 from being cooled down and solidified during the injection molding.

The lower end of the cylindrical member 220 has a direction changing portion 221 having a substantially wedge-like sectional profile as direction changing means. The cylindrical member 220 further has a plurality of engagement portions 222 extending from the top as shown.

The direction changing portion 221 of the substantially wedge-like profile, has a conical profile with a sharp edge portion of the usual wedge-like shape cut off at right angles. The inclined surface 221A of the direction changing portion 221 of the substantially wedge-like shape serves to change the direction of flow of the molten resin 214 through the gate 211 to directions along the surface of the surface material 213.

The engagement portions 222 are each T-shaped in sectional profile with a horizontally extending end portion 223A. The end portion 223A of the engagement portion 222 is accommodated in a coil spring chamber 219 which is a space formed above the recess 215, and it engages with a coil spring 224 which is also accommodated in the coil spring chamber 219.

The coil springs 224 are biasing the cylindrical member 220 upward in the Figure. The gate 211 is closed by the direction changing portion 221 of the cylindrical member 220 with the biasing forces of the coil springs 224.

The overall biasing force of the coil springs 224 is set to be lower than the pressure, under which the molten resin 214 is injected into the cavity 212. That is, the injection pressure applied to the molten resin 214 is applied to the direction changing portion 221 to cause the the cylindrical member 220 to be projected from the gate 211 to open the gate 211 against the biasing forces of the coil springs 224.

Inside the cylindrical member 220, a cooling water path 225 is formed, which serves as cooling means for cooling a portion of the surface material 213 that faces the gate 211.

As shown in FIG. 10, the cooling water path 225 extends in a U-shaped fashion from the from the right end to the left end of the top of the cylindrical member 220 and has an intermediate horizontal portion 225A in the vicinity of the bottom surface of the cylindrical member 220. Flexible tubes 226 are each connected to each end of the cooling water path 225 for circulation of cooling water.

In this embodiment, the injection molding is done in the following procedure.

Figure 11:
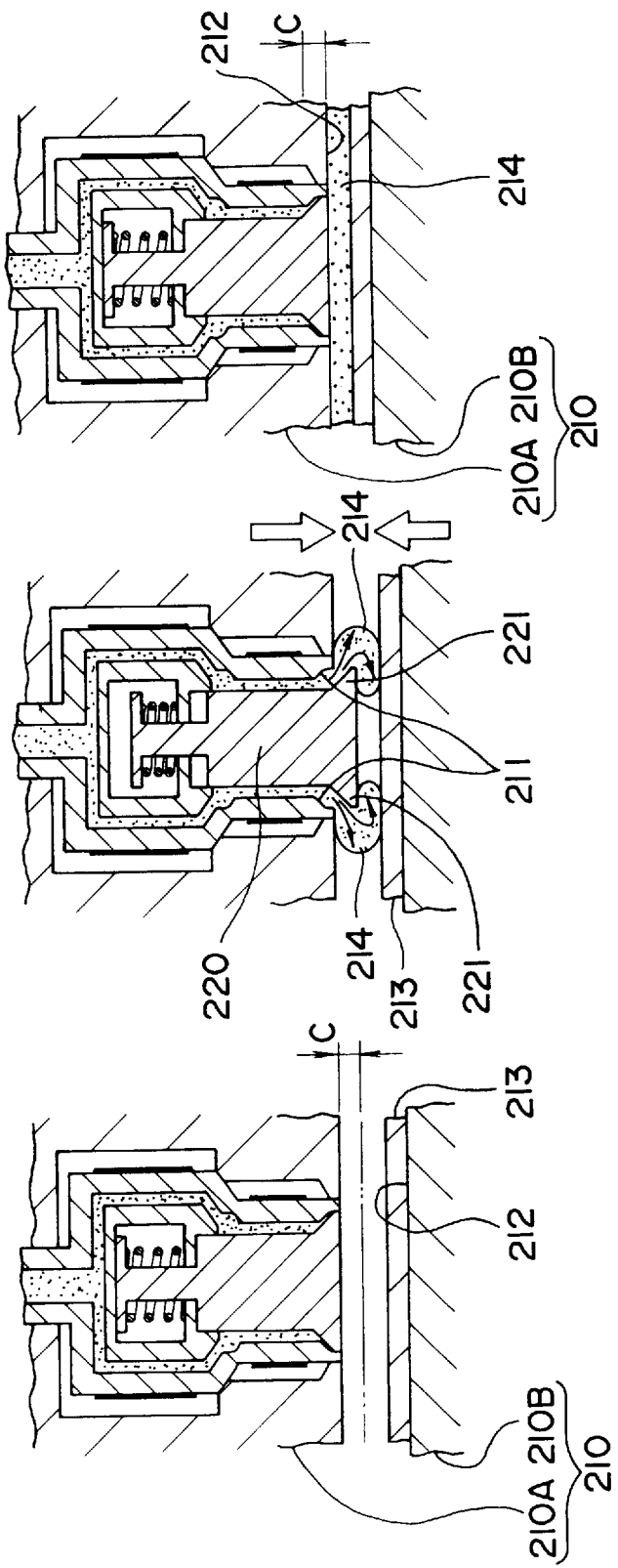
FIGS. 11(A) to 11(C) are views for explaining the procedure of injection molding in the same embodiment.

The surface material 213 is set on the surface of the cavity 212 of the die 210 in advance. Then, as shown in FIG. 11(A), the die 210 is set to a slightly open state, i.e., a state open to a predetermined extent C from the perfectly closed state. The extent C is set suitably in a range of 0.1 to 100 mm.

Then, an injection unit (not shown) is driven to cause injection of molten resin 214 through the gate 211 into the cavity 212. At the same time, as shown in FIG. 11(B), the direction of flow of the molten resin 214 is changed by the direction changing portion 221 to directions along the surface of the surface material 213, while cooling the molten resin 214 in the neighborhood of the bottom of the cylinder 220 with cooling water flowing through the inside of the cylindrical member 220 to obtain cooling of the molten resin 214 such that the fluidity thereof is not lost while the surface material 213 is not melted. Thus, the surface material 213 in the neighborhood of the gate 211 is protected against the high temperature and high pressure of the high temperature, high pressure molten resin 214 supplied through the gate 211.

Subsequently, the closing of the die halves 210A and 210B is resumed to develop the molten resin 214 in the cavity 212 up to every corner thereof. In this way, a desired product is molded. After cooling the molded product, the product is released from the die, thus completing the injection molding.

Since the gate 211 is not present at a single point of the cavity 212 but is present in a ring-like form spreading over the surface of the cavity 212, the molten resin 214 can be developed up to every corner of the cavity 212 even when the die 210 is held slightly open to a small extent C. In addition, it is possible to avoid collisions of flows of molten resin 214.

With this embodiment as above, the following effects are obtainable.

Since the molten resin 214 that is injected through the gate 211 into the cavity 212 is changed in its flow direction to directions along the surface of the surface material 213, the surface material 213 in the neighborhood of the gate 213 is not struck by the molten resin 214 at a high temperature and under a high pressure. Thus, it is possible to prevent damage to the surface material 213 that might otherwise be caused by the collision of the molten resin 214. The injection molding thus is obtainable without causing damage to the surface material 213.

Further, since the cooling water path 225 is provided inside the cylindrical member 220 to cool the member 220 with cooling water passed through the path 225, it is possible to prevent damage to the surface material 213 in the neighborhood of the gate 211 by heat of the high temperature, high pressure molten resin 214 when the molten resin 214 touches the surface material 213. The injection molding thus is obtainable without causing damage to the surface material 213.

Further, since the gate 211 has a ring-like form spreading over the surface of the cavity 212, it is possible to have the molten resin 214 be developed up to every corner of the cavity 212 even with the die 210 held in the slightly open state, and also it is possible to prevent collisions of flows of molten resin 214.

Further, unlike the prior art structure with the provision of a plurality of hole-like gates, it is necessary to provide only a single continuous gate 211. This means that the cost of fabrication of the die 210 is not increased, and the die 210 is obtainable inexpensively.

Moreover, since the gate 211 is opened with the pressure, under which the molten resin 214 is injected, against the biasing forces of the coil springs 224, with the completion of the charging of the molten resin 214 the coil springs 224 automatically cause the cylindrical member 220 to be accommodated in the gate 211. Thus, there is no need of controlling the operation of the cylindrical member 220, and it is possible to simplify the controller for controlling the oil hydraulic system for closing the die 210.

Specific effects of the invention will now be described in connection with Experiment Example 5 as follows.

EXPERIMENT EXAMPLE 5

Experiment Example 5 concerns injection molding, and it was conducted by using a test die having the same structure as the die 210 in the third embodiment described above to obtain a rectangular molding product having a longitudinal dimension of 1,000 mm, a transversal dimension of 500 mm and a thickness of 1.5 mm.

COMPARATIVE EXPERIMENTS 1 AND 2

To confirm the effects of the invention, Comparative Experiments 1 and 2 were conducted, in which the same molding product as in the above experiment was injection molded on the basis of the prior art.

Comparative Experiment 1 was conducted by using a die, in which a conventional hot runner gate system (available under a trade name "Plagate" by Saito Koki Co., Ltd.) was provided by one point provision at the center of the cavity.

Comparative Experiment 2 was conducted by using a die, in which two hot runner gates same as used in Comparative Experiment 1 were provided at its two points in its longitudinal direction.

INJECTING CONDITIONS

In Experiment 5 and Comparative Experiments 1 and 2 noted above, as the injection molding machine was used an exclusive horizontal injection molding machine (with a screw diameter of 160 mm and a max. compressive force of 850 tons) obtained by modifying a universal molding machine. As the base material of the molten resin was used polypropylene (available under a trade name "Idemitsu Polypro J-5050H" by Idemitsu Petrochemical Co., Ltd.). As the surface material was used a laminate material (manufactured as surface material by Kyowa Laser Co., Ltd.) comprising a vinyl chloride layer 0.6 mm thick and a foamed polypropylene layer 3.0 mm thick.

The injection was made under the following conditions.

A. Molding temperature: 180 ° C.
B. Die temperature: 40 ° C.
C. Injection time: 3 sec.
D. Injection pressure: 110 kg/cm$^2$ (gauge pressure)
E. Cooling time: 40 sec.
F. Extent C of opening of the die in the slightly open state: 15 mm
G. Die closing resumption timing: 2.8 sec. after the start of charging molten resin
H. Die closing speed: 10 mm/sec.
I. Compressive load when closing the die: 100 tons

RESULTS

The molding product obtained in Experiment 5 was visually inspected and found to be a satisfactory product free from "wrinkles" or other defective parts over its entirety.

In Comparative Experiment 1, it was impossible to charge a predetermined quantity of molten resin, but molten resin could be charged only in a range of 400 mm from the gate provided at the cavity center.

In Comparative Experiment 2, a predetermined quantity of molten resin could be fully charged. However, inspection of the obtained molding product made as in Experiment 5 revealed that the product was defective in that a weld line was generated in a central portion of the product and also that the surface material in that central portion was sagging and had wrinkles.

The above embodiments are by no means limitative, and the following modifications are covered in the invention.

In the third embodiment the cylindrical member 220 was moved as a whole out of and into the gate 211. However, it is possible to arrange as well such that only an end portion of the cylindrical member can be moved out of and into the gate.

Figure 12:
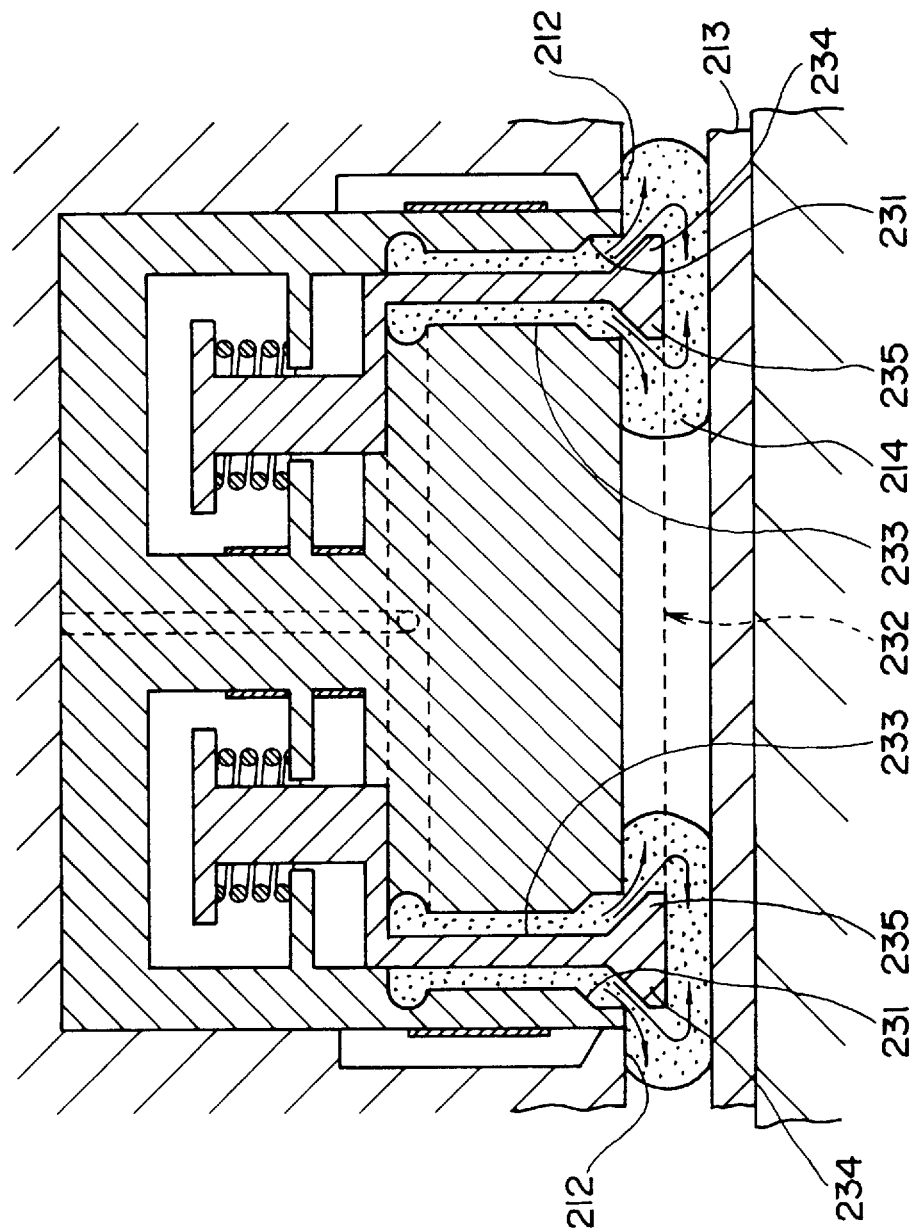
FIG. 12 is a view similar to FIG. 10 but showing a modification of the third embodiment of the invention.

Further, the gate is not limited to the ring-like gap that is defined between the recess 215 open to the surface of the cavity 212 and the cylindrical member 220 that is disposed in the recess 215. For example, it is possible to use a gate 231 as shown in FIG. 12, which is in the form of a ring-like groove open at the surface of the cavity 212.

When adopting this groove-like gate 231, a cylindrical member 232 having a plan shape corresponding to the plan shape of the gate 231 may be provided in the gate 231. The end of the peripheral wall 233 of the cylindrical member 232 as projections 234 and 235, which project radially inward and outward, respectively, and altogether serve as direction changing means. With such direction changing means it is possible to charge molten resin 214 evenly to the opposite sides of the gate 231.

Further, what pushes the direction changing means, such as the direction changing portion 221, against the gate, is not limited to the coils springs 224 or like biasing means, and it is possible to adopt as well such drive means as an oil hydraulic piston-and-cylinder assembly, a pneumatic piston-and-cylinder assembly, an electromagnetic plunger, etc.

Figure 13:
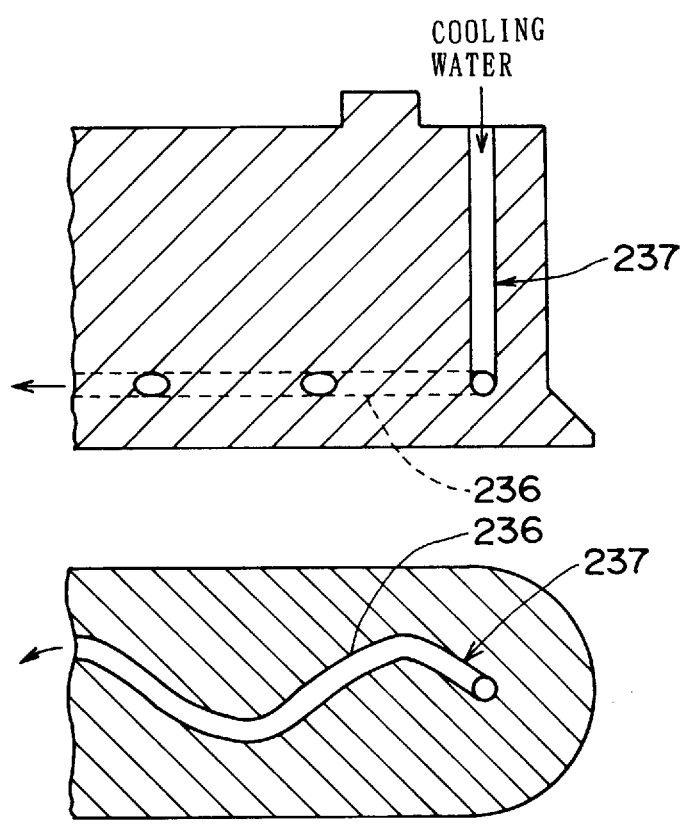
FIG. 13 is an illustration of cooling means in a different modification of the third embodiment of the invention.

Further, the cooling means is not limited to the merely U-shaped cooling water path 225. For example, as shown in FIG. 13, it is possible to adopt a path 236 having a meandering portion 236A extending along the surface of the surface material 213. By the provision of the meandering portion 236A it is possible to improve the cooling efficiency.

Further, while in the above embodiments the cooling means is provided on the side of the die half 210A of the die 210, it is also possible to provide cooling means on the side of the die half 210B of the die 210.

Further, the direction changing means is not limited to the direction changing portion 221 with the sectional profile comprising the triangular portion and the rectangular bottom portion. For example, it is possible to adopt a direction changing portion 237 as shown in FIG. 14, which has a merely triangular sectional profile. A further alternative that may be adopted is a direction changing member 239 as shown in FIG. 15, which has a sectional profile having arcuate sides 238. In general, any sectional profile may be adopted so long as it permits the direction of flow of molten resin emerging through the gate to be changed to directions along the surface of the surface material.

Further, the shape of the gate is not limited to the elliptical ring-like gate 211. For example, it is possible to adopt a ring-like gate 240 having a flower-like plan view as shown in FIG. 16. As a further alternative, it is possible to adopt a non-ring-like gate 241 having a plan view of alphabet letter X as shown in FIG. 17. In general, it is possible to adopt any gate shape so long as it permits molten resin to be developed sufficiently broadly so that every corner of the cavity is filled with the molten resin.

The gate system shown in the above embodiment may, if necessasry, be provided in a plurality in a single die. Also, it may be used in combination with any prior art gate system. The number and combination of gates that may be used may be suitably selected in dependence on the size and kind of the molding product to be obtained.

FOURTH EMBODIMENT

Figure 18:
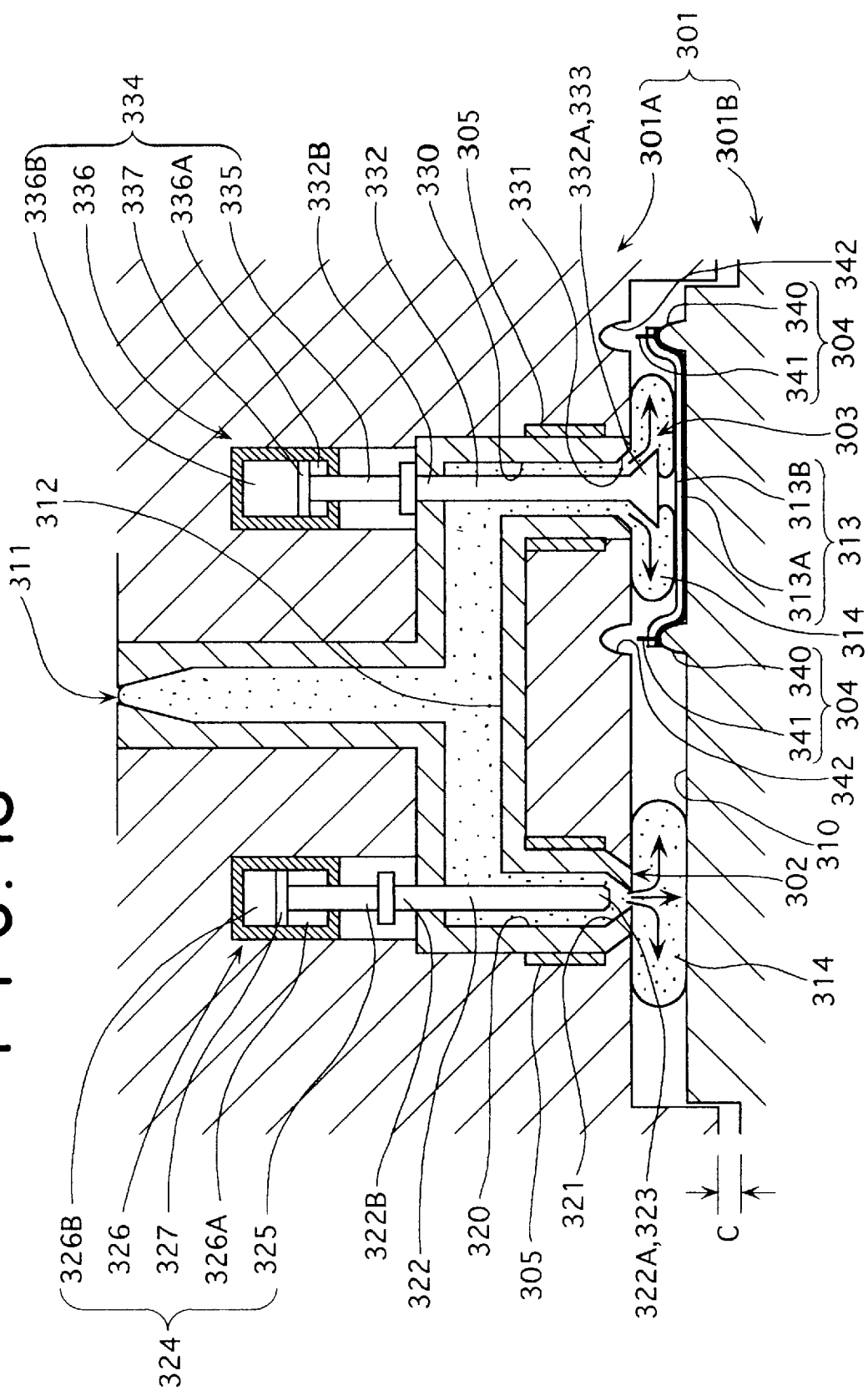
FIG. 18 is a fragmentary sectional view showing a fourth embodiment of the die according to the invention.

FIG. 18 shows a fourth embodiment of the die 301 according to the invention.

The die 301 is a multiple gate system die with a plurality of gates 302 and 303. It defines a cavity 310 with substantially a uniform thickness for injection compression molding a large-size sheet-like product, and comprises two die halves 301A and 301B constituting the opposite sides of the cavity 310.

The die half 301A is a commonly called cavity part formed with a recess which is the cavity 310, and it is secured to an injection molding machine (not shown).

The die half 301A has gates 302 and 303, and it also has a connector port 311 for receiving molten resin from the injection unit and branch paths (manihold) 312, through which the molten resin from the connector port 311 is supplied to the gates 302 and 303.

The die half 301B is a commonly termed core part formed with a raised portion corresponding to the recess in the die half 301B, and it is movably mounted on an injection molding machine (not shown) such that it is movable toward and away from the die half 301A. Inside the cavity 310 in the die half 301B securing means 304 is provided for securing the surface material 313 which constitutes the surface of the molding product.

The gate 302 is for charging molten resin 314 to a portion of the cavity 310 without the surface material 313, and it has a general conventional structure.

More specifically, the gate 302 is an outlet of a path 320, which extends vertically in the Figure and communicating one of the branch paths (manihold) 312 and the cavity 310. The path 320 has a tapered end which is a nozzle 321. Thus, molten resin is injected through the gate 302 at right angles to the surface of the cavity 310.

A rod-like member 322 is disposed for vertical movement in the path 320. A lower end 322A of the rod-like member 322 constitutes a valve body 323 for opening and closing the gate 302. The other end 322B of the rod-like member 323 is coupled to a piston rod 325 of an upper oil hydraulic piston-and-cylinder assembly 324.

The oil hydraulic piston-and-cylinder assembly 324 is of a composite drive type having a cylinder 326, the interior of which is partitioned by a piston 327 into two oil hydraulic pressure chambers 326A and 326B. When an oil hydraulic pressure is applied to the lower oil hydraulic chamber 326A of the oil hydraulic piston-and-cylinder assembly 324, the rod-like member 322 is raised to open the gate 302.

When oil hydraulic pressure is applied to the other or upper oil hydraulic chamber 326B, the rod-like member 322 is lowered to close the gate 302.

The other gate 303 is for charging a portion of the cavity 310 with the surface material 313 set therein, and it has a structure according to the invention.

More specifically, the gate 303 is an outlet of a path 330, which extends vertically in the Figure and communicates the other one of the branch paths 312 and the cavity 310. The path 330 has a flaring end which is a nozzle 331.

A rod-like member 332 is movably disposed in the path 330 such that it can be moved vertically. The lower end 332A of the rod-like member 332 has a direction changing portion 333, which has a substantially conical shape flaring toward the end.

The direction changing portion 333 constitutes direction changing means with the inclined surface thereof effective for changing the direction of flow of molten resin injected through the gate 303 to directions along the surface of the surface material 313. Further, the direction changing portion 333 corresponds in size to the nozzle 331, and it also serves as a valve body for opening and closing the gate 303.

The other end of the rod-like member 332 is coupled to a piston 335 of an upper oil hydraulic piston-and-cylinder assembly 334.

The oil hydraulic piston-and-cylinder assembly 334 has the same structure as the oil hydraulic piston-and-cylinder assembly 324 on the side of the gate 302. The assembly 334 has a cylinder 336, which is partitioned by the piston 337 into two oil hydraulic chambers 336A and 336B.

The direction of driving by the oil hydraulic piston-and-cylinder assembly 334 for closing the gate 303 is opposite to the direction of driving by the oil hydraulic piston-and-cylinder assembly for closing the gate 302.

More specifically, when oil hydraulic pressure is applied to the lower oil hydraulic chamber 336A in the oil hydraulic piston-and-cylinder assembly 334, the rod-like member 332 is raised to close the gate 303. When oil hydraulic pressure is applied to the other or upper oil hydraulic chamber 336B in the oil hydraulic piston-and-cylinder assembly 334, the rod-like member 332 is lowered to open the gate 303.

Figure 19:
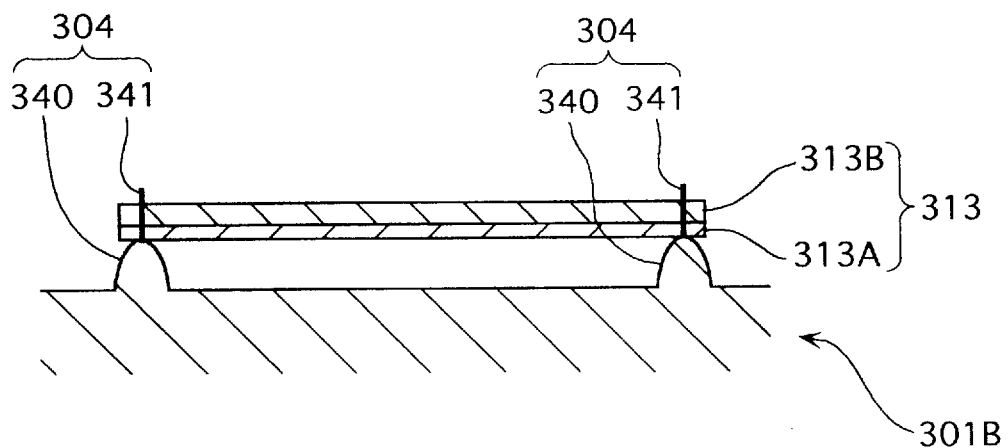
FIG. 19 is an enlarged-scale fragmentary sectional view showing securing means in the same embodiment.

The surface material 313, as shown in FIG. 19, has a surface layer 313A which is less subject to breakage and a foamed layer 313B having a cushioning property.

The surface layer 313 is a resin layer of vinyl chloride or the like to be in close contact with the surface of the surface material 301B.

The foamed layer 313B is made of a foam of polypropyrene or the like which is to be found on the inner side of the surface layer 313A in the cavity 310.

Securing means 304 includes a pair of ridges 340 formed on the surface of the die half 301B at predetermined positions thereof and facing each other and a plurality of lock needles 341 provided on top of the ridges 340 for penetrating and securing the surface material 313.

The ridges 340 are adapted to extend along the edges of the surface material 313.

As shown in FIG. 19, the surface material 313 is stretched taut on the ridges 340 facing each other with its edges secured by the lock needles 341.

When molten resin 314 is charged in this state, its pressure has an effect of pushing and causing flexing of an intermediate portion of the surface material 313, thus generating an adequate tension in the surface material 313 such as to pull the surface material 313 to the opposite sides. Owing to this tension, no wrinkles or the like are formed on the surface of the surface material 313 after the injection molding.

The ridges 340 serve as tension generating means for generating an adequate tension in the surface material 313 when charging molten resin 314.

The surface of the cavity 310 on the side of the die half 301A is formed with recesses 342 corresponding to the ridges 340. Thus, when the die halves 301A and 301B are closed, end portions of the ridges 340 are accommodated in the recesses 342 so that the ridges 340 do not interfere with the side of the die half 301A even with a narrow gap of the cavity 310.

The lock needles 341 are thin and tough metal needles which project in the directions of opening and closing the die 301 (i.e., vertical direction in the Figure). The surface material 313 which is secured by such lock needles 341, is capable of being removed from the die half 301B by moving it in the direction of opening the die 301 (i.e., upward in the Figure).

Electric heaters 305 are disposed around the outer peripheries of the walls of the paths 320 and 330 to prevent molten resin 314 charged through the gates 302 and 303 from being cooled down and solidified during the injection molding.

In this embodiment, the injection molding is done in the following procedure.

The surface material 313 is set in the securing means 304 of the die half 301B, as shown in FIG. 19, and then the die halves 301A and 301B are mounted in an injection molding machine (not shown).

Then, as shown in FIG. 18, the rear side of the movable die half 301B is blocked to prevent its retreat from a predetermined position so that the gap between the die halves 301A and 301B does not become greater than a predetermined extent C of opening from the perfectly closed state. The extent C of opening corresponds to the extent of compression of molten resin when closing the die, and it is suitably set in a range of 5 to 15 mm.

Subsequently, an injection unit (not shown) is driven, while the gates 302 and 303 are opened, thus starting the charging of molten resin 314. At this time, as shown in FIG. 18, the direction of flow of the molten resin 314 is changed by the direction changing portion 333 to directions along the surface of the surface material 313. The surface material 313 thus is not crushed by the molten resin 314. The cushioning property of the surface material 313 thus can be maintained despite the high temperature and high pressure of the molten resin 314 charged through the gate 303.

Subsequently, immediately before or after the completion of charging of the molten resin 314, the closing of the die halves 310A and 301B is resumed. With this closing of the die the molten resin 314 in the cavity 310 is developed up to every corner of the cavity to obtain a desired molding product. Then, after the die 310 has been cooled down, the molding is released therefrom thus completing the injection molding. Plasticization of resin for the next injection cycle is made after the completion of the prevailing injection molding cycle.

With the embodiment as described above, the following effects are obtainable.

With the securing means 304 provided inside the cavity 310, it is possible to secure the surface material 313, which has a small area and constitutes part of the surface of the molding. In addition, since it is possible to mold a product with the surface thereof partly constituted by the surface material 313, it is possible to omit a step of bonding the surface material 313 as in the prior art and greatly improve the manufacturing efficiency.

Further, it is possible to use the surface material 313, which is expensive, for only a portion requiring the cushioning property, thus reducing the cost increase. In addition, for a portion, with which the cushioning property leads to a mechanical inconvenience, the base of the molding can be positively exposed, thus giving rise to no structural problem.

Further, since the gate 303 for charging molten resin 314 into a portion of the cavity 310 with the surface material 313 provided therein is provided with a direction changing portion 333 to change the direction of flow of molten resin 314 emerging through the gate 303 to directions along the surface of the surface material 313, the molten resin 314 does not collide with the surface material 313 irrespective of the distance from the gate 303 to the surface material 313. Thus, it is possible to prevent damage to the surface material 313 which may have a considerable thickness.

Further, since the molten resin 314 does not collide with the surface material 313 irrespective of the distance thereof from the gate 303, it is possible to set the compression extent (i.e., extent C of opening) of the die 301 to be small by taking the state of flow of the molten resin 314 charged through the gate 302 into considerations. Thus, where the die 301 is of a multiple gate type including a usual valve gate, it is possible to obtain a satisfactory molding product. Further, since the gate 302 can be constructed with general purpose parts, cost reduction of the die 301 is obtainable.

Further, since the surface material 313 is secured with the thin lock needles 341 of the securing means 304, the product surface will have only small needle holes. Thus, the appearance of the molding product is not spoiled by the provision of the securing means 304 inside the cavity 310. Besides, the lock needles 341 are simple in structure and can thus reduce the cost of manufacture of the die 301 and the maintenance burden.

Further, the lock needles 341 are provided on top of the ridges 340, which form recesses in the surface of the molding product obtained by the injection molding, with the needle holes found as the trace of the lock needles 341 in the bottom of the recesses The small needle holes are not noticeable. Also, the recesses are found along the edges of the surface material 313. It is thus possible to mold a product with excellent design.

Further, the ridges 340 as tension generating means are provided as an element of the securing means 304, and the surface material 313 is stretched on the ridges 340 which face each other and is given an adequate tension when charging the molten resin 314. Thus, no wrinkles or the like are formed on the surface of the surface material after the injection molding, and it is thus possible to mold a product having satisfactory appearance.

Further, since the oil hydraulic piston-and-cylinder assemblies 302 and 303 are adopted for causing forced movement of the valve body 323 and direction changing portion 333 to open and close the gates 302 and 303, it is possible to obtain optimum control of the timings of the start and end of the charging. Molten resin 314 thus can be charged in an accurate quantity, and it is possible to reduce defective molding products.

Now, specific effects of the invention will be described in connection with the following Experiment Example 6.

EXPERIMENT EXAMPLE 6

Experiment Example 6 was conducted by using the above embodiment of the die 301 to injection mold a door panel as automotive interior fitting. As the gate 302 of the die 301 was used a general oil hydraulic valve gate system (manufactured by Mold Master Inc.).

COMPARATIVE EXPERIMENT 5

Comparative Experiment 3 was conducted to confirm the effects of the invention. In this instance, the same door panel as in Experiment 6 was injection molded on the basis of the prior art.

The die in Comparative Experiment 3 used a general oil hydraulic valve gate system (manufactured by Mold Master Inc.) without any direction changing means as the gate for charging molten resin in a cavity portion with the surface material provided therein.

COMPARATIVE EXPERIMENT 4

Comparative Experiment 4 was conducted in order to confirm that a satisfactory molding produce as in the above embodiment can not be obtained by merely increasing the extent of compression in the die. In this instance, the same die as in Comparative outside the range shown in connection with the above embodiment. Here, the same door panel as in Experiment 6 was injection molded.

INJECTING CONDITIONS

In Experiment 6 and Comparative Experiments 3 and 4 noted above, as the injection compression molding machine was used what was obtained by adding an injection compression molding mechanism to an ordinally horizontal injection molding machine (with a screw-diameter of 105 mm and a max. compressive pressure of 850 tons, manufactured by Mitsubishi Heavy Industry).

As the base material of the molten resin was used polypropylene (available under a trade name "Idemitsu Polypro J-5050H" by Idemitsu Petrochemical Co., Ltd.).

As the surface material was used a laminate material having a surface layer of non-woven cloth 0.5 mm thick and a foamed layer of 15 times polypropyrene foam 3.0 mm thick.

The injection was done under the following conditions.

A. Molding temperature: 180 ° C.
B. Die temperature: 40 ° C.
C. Injection time: 4 sec.
D. Injection pressure: 90 kg/cm$^2$ (gauge pressure)
E. Cooling time: 50 sec.
F. Extent of molten resin compression (i.e., extent C of opening): 10 mm (Experiment 6, Comparative Experiment 3), 30 mm (Comparative Experiment 4)
G. Compression start timing: Set to 3.7 sec. after the start of charging.
H. Compression speed: 10 mm/sec.

RESULTS

In Experiment 6, the surface material that was stretched on the molding obtained was free from damage caused by melt of the foamed layer, and satisfactory appearance and excellent cushioning property were secured. Further, the surface of the exposed resin not covered by the surface material was free from such defects as wrinkles, silver streaks, flow marks, etc. It was thus determined that the obtained molding product has satisfactory appearance and a sufficient cushioning property in a necessary portion.

In Comparative Experiment 3, the surface of the exposed resin not covered by the surface material was free from such defects as wrinkles, silver streaks, flow marks, etc. However, the surface material in the neighborhood of the gate had damage caused by the fusion of the foamed layer. It was thus determined that the appearance of the molding product was spoiled and that the necessary cushioning property could not be obtained in the necessary portion.

In Comparative Experiment 4, the surface material was free from damage due to the fusion of the foamed layer, and its cushioning property was secured. However, the surface of the exposed resin in the neighborhood of the gate had a large number of wrinkles. It was thus determined that the appearance of the molding product was spoiled although sufficient cushioning property could be obtained.

The embodiments described above are by no means limitative, and the following modifications are covered by the invention.

Figure 20:
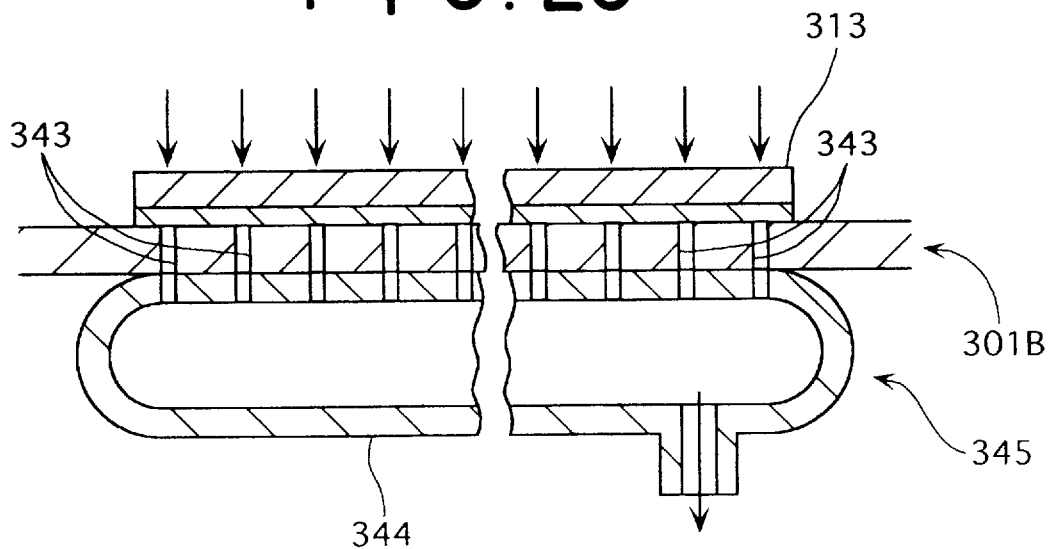
FIG. 20 is a sectional view, partly broken away, showing securing means in a modification of the fourth embodiment of the invention.

The securing means is not limited to the one, in which the surface material 313 is secured by the lock needles 341 penetrating therethrough. For example, as shown in FIG. 20, a vacuum type securing means 345 may be used. In this case, the die half 301B is formed with a number of very small holes 343 or vacuum suction, and the surface material 313 is secured with a suction force which is obtained by evacuating a vacuum chamber 344 communicating with the very small holes 343 with an evacuating pump or the like. As a further alternative, it is possible to adopt electrostatic securing means. In this case, the surface material is electrostatically charged, while the die is charged to the opposite polarity, whereby the surface material is secured by an electrostatic force of attraction.

Where the surface material partly gets out of the die, the getting-out portion of the surface material may be secured with a clamp or like securing member provided outside the die.

Further, the die is not limited to limited to the multiple gate die having a plurality of circular gates 302 and 303. For example, a continuous slit-like gate may be used, which has a shape of a planar spread along the surface of the cavity surface, for charging molten resin into both of a cavity portion with the surface material present therein and the other cavity portion without any surface material.

Figure 21:
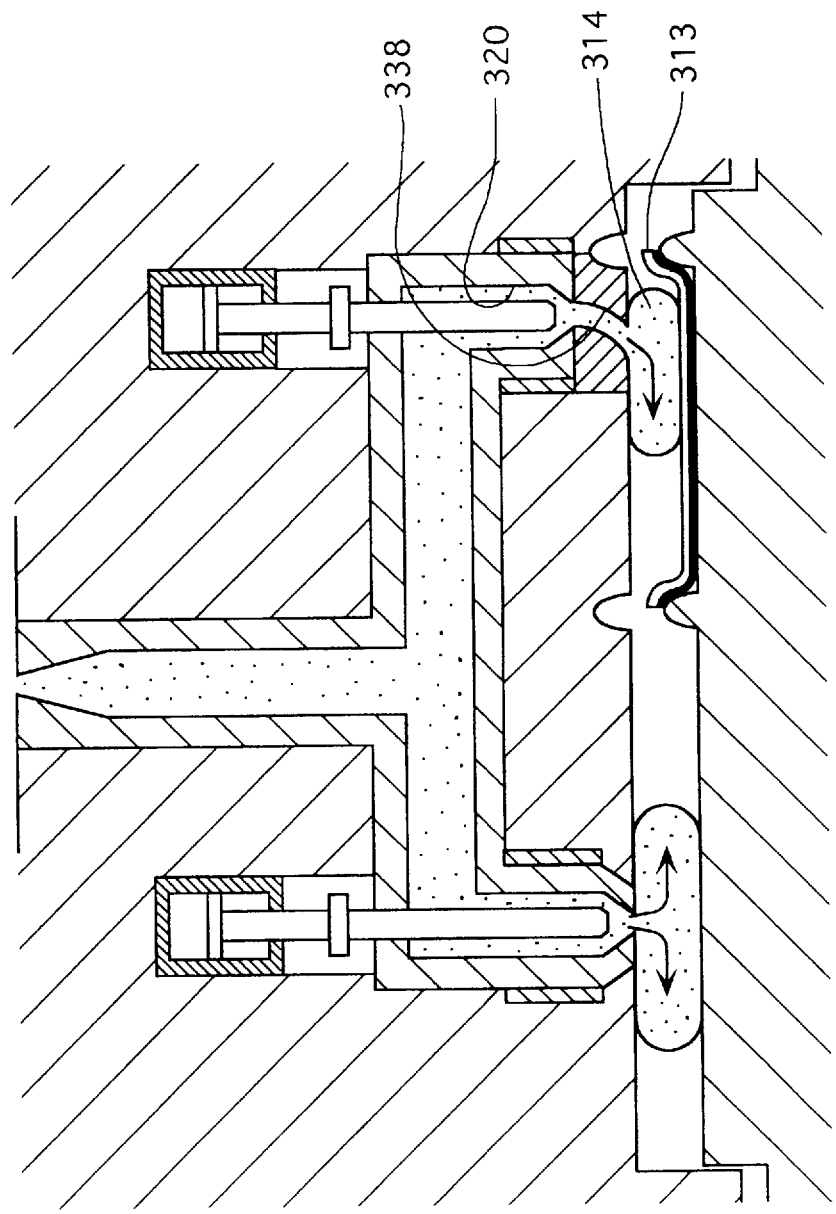
FIG. 21 is a view similar to FIG. 18 but showing a different modification of the fourth embodiment of the invention.
Figure 22:
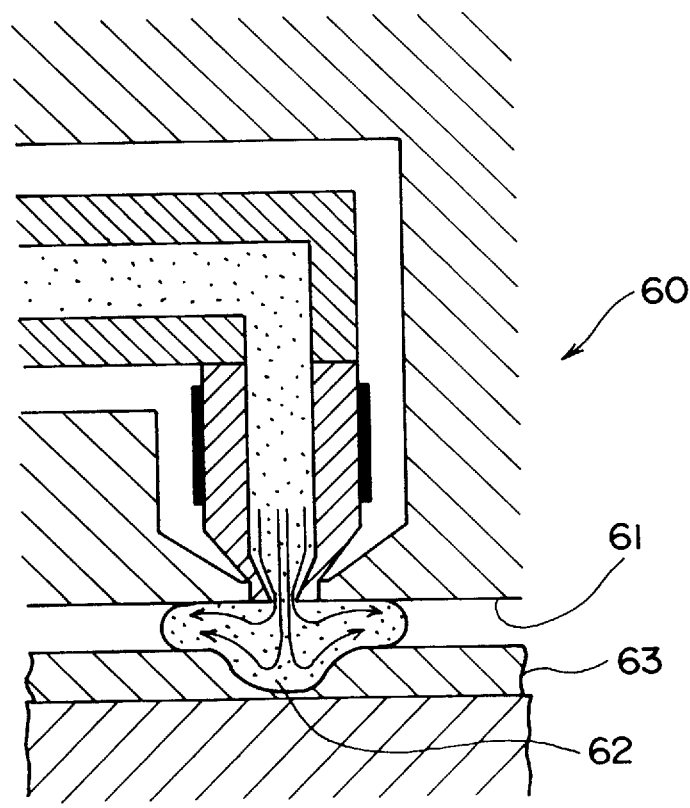
FIG. 22 is a view similar to FIG. 1 but showing a prior art example.

Further, the direction changing means is not limited to the substantially conical direction changing portion 333 disposed at the outlet of the gate 303. As a further alternative, as shown in FIG. 21, a curved nozzle type direction changing means may be used, which is disposed at the outlet of the passage for supplying molten resin 314 to the cavity 310 and has a curved nozzle 338 which is curved to eventually extend along the surface of the surface material 313. In general, any direction changing means may be used so long as the direction of flow of molten resin charged through the gate to directions along the surface of the surface material.

Further, the gate 303 is not limited to the one, which is forcibly opened and closed by driving oil hydraulic piston-and-cylinder assemblies or the like. For example, it is possible to use a gate, which is opened by the charging pressure of molten resin 314 applied to a direction changing portion provided at one end of a rod-like member 332 and closed when the charging pressure of the molten resin 314 is reduced by a coil spring or like biasing means provided on the side of the other end of the rod-like member 332.

Further, the surface material and base material of resin are not limited to those noted above in connection with the fourth embodiment.

Specifically, for the surface layer may be used vinyl chloride, thermoplstic elastomer, non-woven cloth, woven cloth, etc.

For the foamed layer may be used polypropyrene backed up by non-woven or woven cloth, thick non-woven cloth, etc.

For the base material of resin may be used themoplastic resins, e.g., polyethylene, polystyrene, ABS, polycarbonate, polyamide, etc., and fiber-reinforced resins obtained by blending fillers, glass fibers, etc. with the above thermoplastic resins.

Where the surface material is particularly thermally weak, or when it is desired to increase the temperature of the molten resin, the rod-like member 332 in the fourth embodiment may be made hollow, and cooling water may be passed through the hollow member to cool the direction changing member 333. As a further alternative, the die half 301B may be provided with a cooling water path to cool the surface material.

While in the fourth embodiment the injection compression molding machine was adopted as the injection molding machine, it is possible to adopt an injection press molding machine as well in dependence on the properties or shape of the product to be molded.

What is claimed is:

1. A method of forming a laminate structural molding including the steps of:

positioning a layer of surface material in a die cavity, said die cavity being formed by a pair of die halves having opposed, spaced apart, faces, wherein said positioning step includes placing said surface material against said exposed face of a first said die half so that said surface material has an exposed surface located adjacent said exposed face of a second said die half;

positioning said die halves apart from each other a predetermined distance so that said second die half exposed face and said surface material are spaced apart a predetermined first distance;

injecting a resin into said die cavity and onto said exposed surface of said surface material through a supply bore formed in said second die half, wherein said resin is deposited on said surface material through an opening formed in said exposed face of said second die half and wherein said injection of said resin into said cavity is controlled by a valve secured to said second die half, said valve having a valve head which is cooled, said valve head having a first position in which said valve head is located in said opening formed in said exposed face of said second die half so as to close said opening and a second position located in said cavity formed by said die halves so as to open said opening and said valve head is formed with an outwardly extending surface so that during said resin injection step, said valve head directs said resin flow laterally away from said opening and from said exposed surface of said surface material located adjacent said opening; and compressing said first and second die halves together so that said surface material exposed surface and said second die half exposed face are spaced apart a second distance less than said first distance.

2. The method of forming a laminate structural molding of claim 1, wherein said surface material is selected to include a foam layer that forms said exposed surface of said surface material and said foam layer has an initial thickness of approximately 3.0 mm.

3. The method of forming a laminate structural molding of claim 1, further including the steps of heating said resin material as said resin flows through said supply bore and cooling said resin as said resin flows around said extended valve head after said resin is injected from said opening formed in said exposed face of said second die half.

4. The method of forming a laminate structural molding of claim 1, wherein said surface material is selected to include a foam layer that forms said exposed surface of said surface material and said foam layer has an initial thickness of approximately 3.0 mm.

5. The method of forming a laminate structural molding of claim 1, wherein: when said valve is in said open position, said valve is positioned so that valve head abuts said exposed surface of said surface material located adjacent said second die half opening; after said resin is injected into said die cavity, said valve is returned to said closed position; and after said valve is returned to said closed position, said die halves are compressed together.

6. The method of forming a laminate structural molding of claim 3, further including the steps of heating said resin material as said resin flows through said supply bore and cooling said resin as said resin flows around said extended valve head after said resin is injected from said opening.

7. The method of forming a laminate structural molding of claim 5, wherein said surface material is selected to include a foam layer that forms said exposed surface of said surface material and said foam layer has an initial thickness of approximately 3.0 mm.

8. The method of forming a laminate structural molding of claim 6, wherein said surface material is selected to have a foam layer that forms said exposed surface of said surface material, said foam layer having an initial thickness of approximately 3.0 mm.

9. The method of forming a laminate structural molding of claim 1, further including the steps of:

securing said surface material in a first portion of said die cavity; and simultaneously with said injection of resin onto said surface material exposed surface, injecting said resin material into a second portion of said die cavity adjacent said portion of said die cavity in which said surface material is secured wherein in said second portion of said die cavity said resin is directly onto said exposed face of said first die half so that said laminate structural molding includes a first section formed a laminate of said surface material and said resin and a second section formed of said resin.

10. The method of forming a laminate structural molding of claim 9, wherein said surface material is selected to include a foam layer that forms said exposed surface of said surface material and said foam layer has an initial thickness of approximately 3.0 mm.

11. The method of forming a laminate structural molding of claim 9, wherein said injection of said resin onto said surface material exposed surface is controlled by a valve secured to said second die half, said valve having a valve head having a first position in which said head is located in said opening so as to close same and a second position in which said head located in said cavity so as to open said opening and said valve is formed with an outwardly extending surface adjacent said opening so as to direct said resin flow away from said opening and wherein after said resin is injected onto said exposed surface of said material, said valve head is moved to said closed position.

12. The method of forming a laminate structural molding of claim 11, wherein said surface material is selected to include a foam layer that forms said exposed surface of said surface material and said foam layer has an initial thickness of approximately 3.0 mm.

\* \* \* \* \*

UNITED STATES PATENT AND TRADEMARK OFFICE
CERTIFICATE OF CORRECTION

PATENT NO. : 5 846 466
DATED : December 8, 1998
INVENTOR(S) : Tomokazu ABE et al It is certified that error appears in the above-indentified patent and that said Letters Patent is hereby corrected as shown below:

Column 20, line 6; change "apart, faces, wherein" to
---apart faces, wherein---.

line 62; change "claim 3" to ---claim 5---.
Column 21, line 18; after "directly" insert ---injected---.
line 20; after "formed" insert ---of---.

Signed and Sealed this

Fourteenth Day of September, 1999

Attest:

Q. TODD DICKINSON

*Attesting Officer*   *Acting Commissioner of Patents and Trademarks*